(12) United States Patent
Creel et al.

(10) Patent No.: US 11,487,520 B2
(45) Date of Patent: Nov. 1, 2022

(54) AUTOMATICALLY GENERATING REASONING GRAPHS

(71) Applicant: Cotiviti, Inc., Atlanta, GA (US)

(72) Inventors: Christopher Taylor Creel, Atlanta, GA (US); William Paige Vestal, Milton, GA (US); Christopher Shawn Watson, Alpharetta, GA (US)

(73) Assignee: Cotiviti, Inc., Atlanta, GA (US)

( * ) Notice: Subject to any disclaimer, the term of this patent is extended or adjusted under 35 U.S.C. 154(b) by 1286 days.

(21) Appl. No.: 15/828,706

(22) Filed: Dec. 1, 2017

(65) Prior Publication Data

US 2019/0171953 A1 Jun. 6, 2019

(51) Int. Cl.
*G06F 17/00* (2019.01)
*G06F 8/51* (2018.01)
*G06N 5/04* (2006.01)
*G06F 8/41* (2018.01)
*G06F 40/14* (2020.01)
*G06F 40/35* (2020.01)
*G06F 40/157* (2020.01)

(52) U.S. Cl.
CPC ............... *G06F 8/51* (2013.01); *G06F 8/41* (2013.01); *G06F 40/14* (2020.01); *G06F 40/157* (2020.01); *G06F 40/35* (2020.01); *G06N 5/045* (2013.01)

(58) Field of Classification Search
CPC ... G06F 8/41; G06F 8/51; G06F 40/14; G06F 40/157; G06F 40/35; G06N 5/045
USPC ................ 706/46; 717/136–144, 154–157
See application file for complete search history.

(56) References Cited

U.S. PATENT DOCUMENTS

| 5,343,554 A | 8/1994 | Koza et al. |
| 5,778,157 A | 7/1998 | Oatman et al. |
| 6,813,615 B1 | 11/2004 | Colasanti et al. |
| 7,013,469 B2* | 3/2006 | Smith .................. G06F 9/465 719/315 |
| 7,207,038 B2* | 4/2007 | Bicsak .................. G06F 8/433 703/21 |
| 7,917,455 B1 | 3/2011 | Dobson et al. |
| 9,110,882 B2 | 8/2015 | Overell |
| 9,311,429 B2 | 12/2016 | Dietrich |
| 10,896,029 B2* | 1/2021 | Slesarenko ............... G06F 8/34 |
| 2003/0135453 A1 | 7/2003 | Caulfield et al. |
| 2007/0179966 A1 | 8/2007 | Li et al. |
| 2008/0005628 A1 | 1/2008 | Underdal et al. |
| 2008/0133273 A1 | 6/2008 | Marshall |
| 2008/0294644 A1 | 11/2008 | Liu et al. |
| 2010/0031000 A1 | 2/2010 | Flynn et al. |
| 2010/0306167 A1 | 12/2010 | Crawford et al. |
| 2011/0213981 A1 | 9/2011 | Griffin |

(Continued)

FOREIGN PATENT DOCUMENTS

EP 1089222 A1 4/2001

OTHER PUBLICATIONS

Bogacz et al., "Automating Transliteration of Cuneiform from Parallel Lines with Sparse Data", 2017, IEEE, pp. 615-620. (Year: 2017).*

(Continued)

*Primary Examiner* — Ted T. Vo
(74) *Attorney, Agent, or Firm* — Perkins Coie LLP

(57) ABSTRACT

Embodiments disclosed herein relate to methods and systems for transliterating reasoning graphs and using the same to determine insights.

35 Claims, 9 Drawing Sheets

(56) References Cited

U.S. PATENT DOCUMENTS

| | | | |
|---|---|---|---|
| 2011/0307435 A1 | 12/2011 | Overell et al. | |
| 2013/0283231 A1* | 10/2013 | Van Megchelen | G06F 16/955 717/106 |
| 2014/0108321 A1 | 4/2014 | Buchanan et al. | |
| 2015/0317337 A1 | 11/2015 | Edgar | |
| 2016/0156595 A1 | 6/2016 | Wu et al. | |
| 2016/0350389 A1 | 12/2016 | Kloke et al. | |
| 2017/0083637 A1 | 3/2017 | Cho et al. | |
| 2017/0220698 A1 | 8/2017 | Dietrich et al. | |
| 2017/0339187 A1 | 11/2017 | Papamartzivanos | |
| 2018/0349773 A1 | 12/2018 | Creel et al. | |

OTHER PUBLICATIONS

International Search Report and Written Opinion from International Application No. PCT/US2018/033194 dated Aug. 8, 2018.
International Search Report and Written Opinion from International Application No. PCT/US2018/054367 dated Dec. 3, 2018.
International Search Report and Written Opinion from International Application No. PCT/US2020/017424 dated Apr. 30, 2020.
Issue Notification for U.S. Appl. No. 15/610,945 dated Mar. 3, 2021.
Non-Final Office Action for U.S. Appl. No. 15/610,945 dated Apr. 6, 2020.
Notice of Allowance for U.S. Appl. No. 15/610,945 dated Nov. 16, 2020.
Peng, et al., "Cross-media analysis and reasoning: advances and directions", In: Frontiers of Information Technology & Electronic Engineering, Retrieved on Apr. 7, 2020 https://link.springer.com/content/pdf/10.1631/FITEE.1601787.PDF entire document, Jan. 1, 2017.
U.S. Appl. No. 15/610,945, filed Jun. 1, 2017.
Indian Application No. 202047027563, First Examination Report dated Jul. 27, 2021, pp. 1-8.
European Application No. 18882430.4 Supplementary Search Report dated Nov. 3, 2021, pp. 1-12.
Liu, Ying. Region-based Image Retrieval with high-level semantics using decision tree learning. Pattern Recognition, Elsevier GB, vol. 41, No. 8, Aug. 2008, pp. 2554-2570.
Anonymous Decision tree (Wikipedia article), Nov. 20, 2017, pp. 1-2.

* cited by examiner

200

210 — Inputting a target reasoning graph into a computer, wherein the target reasoning graph includes:
- A plurality of leaf nodes each defining an insight;
- A plurality of reasoning paths each terminating at a leaf node, and
- A plurality of internal nodes each describing a reasoning function in plain language format, wherein each reasoning function defines a portion of the plurality of reasoning paths and defines queries and inputs for making a discrete decision with reference data at a specific point along a selected reasoning path;
- Wherein the plurality of internal nodes, the plurality of leaf nodes, and the plurality of reasoning functions of the target reasoning graph are in a plain language format;

220 — Providing, in the computer, a transliteration library including:
- A portfolio of templating functions in a templating language;
- A portfolio of reasoning functions in the plain language format;
- Wherein the transliteration library defines a correspondence between each reasoning function of the portfolio of reasoning functions and a selected templating function of the portfolio of templating functions;

230 — With the computer, automatically generating a templating language representation of the target reasoning graph by correlating the reasoning functions of the target reasoning graph with the templating functions of the portfolio of templating functions corresponding thereto

240 — Outputting the templating language representation of the target reasoning graph

410
Inputting a target reasoning graph into a computer in data exchange format, wherein the target reasoning graph includes:
    A plurality of leaf nodes each defining an insight;
    A plurality of reasoning paths each terminating at a leaf node, and
    A plurality of internal nodes each describing a reasoning function in plain language format, wherein each reasoning function defines a portion of the plurality of reasoning paths and defines queries and inputs for making a discrete decision with reference data at a specific point along a selected reasoning path;
    Wherein the plurality of internal nodes, the plurality of leaf nodes, and the plurality of reasoning functions of the target reasoning graph are in a plain language format

420
Providing, in the computer, a transliteration library including:
    A portfolio of templating functions in a templating language;
    A portfolio of reasoning functions in the plain language format;
    Wherein the transliteration library defines a correspondence between each reasoning function of the portfolio of reasoning functions and a selected templating function of the portfolio of templating functions

430
With the computer, automatically generating a templating language representation of the target reasoning graph by correlating the reasoning functions of the target reasoning graph with the templating functions of the portfolio of templating functions corresponding thereto

640
With the computer, converting the templating language representation of the target reasoning graph into one or more of a high-level programming language representation or a documentation language representation of the target reasoning graph

650
With at least one compiler, converting the high-level programming language representation of the target reasoning graph to machine executable code

660
With the computer and the machine executable code of the target reasoning graph, determining an insight using the reference data to make each discrete decision corresponding to each reasoning function in the selected reasoning path until the selected reasoning path reaches a selected leaf node corresponding thereto

FIG. 6

| TRUE | This is a new Claim |
|---|---|
| TRUE | There are two claims lines with the same date of service |
| TRUE | There are two claims lines with the same procedure code |
| TRUE | There are two claims lines with the same number of units |
| TRUE | The claim lines come from the same form type |
| FALSE | The claim under evaluation is a F-1450 |
| TRUE | There are two claims lines have the same place of service |
| FALSE | The claim under evaluation has zero modifier |
| TRUE | The claim under evaluation has one modifiers |
| FALSE | The modifiers for both claim lines are the same |
| TRUE | The modifiers for the claim line under evaluation bounce off the modifiers in the other claim line |
| TRUE | The modifiers of the other claim line do not contain exception modifiers for the claim line under evaluation |
| INSIGHT | The modifiers for the claim line under evaluation bounce off the modifiers in the other claim line |

FIG. 8

AUTOMATICALLY GENERATING REASONING GRAPHS

BACKGROUND

A reasoning graph may describe a formulaic and logical flow of discrete questions used to determine an overall outcome of an overarching question. Reasoning graphs can be input into a computer in a programming language (e.g., high-level programming language). Translation of one programming language to another programming language may require manual coding of the programming languages in custom software such as a translator, converter, or compiler. Such manual coding or custom software may be costly or time consuming.

SUMMARY

Embodiments disclosed herein relate to methods, systems, and computer program products for automatically transliterating reasoning graphs and determining insights using the transliterated reasoning graphs.

In an embodiment, a method of automatically outputting transliterations of a target reasoning graph is disclosed. The method includes inputting a target reasoning graph into a computer. The target reasoning graph includes a plurality of leaf nodes each defining an insight, a plurality of reasoning paths each terminating at a leaf node, and a plurality of internal nodes each describing a reasoning function in plain language format, wherein each reasoning function defines a portion of the plurality of reasoning paths and defines queries and inputs for making a discrete decision with reference data at a specific point along a selected reasoning path. The plurality of internal nodes, the plurality of leaf nodes, and the plurality of reasoning functions of the target reasoning graph are in a plain language format. The method includes providing, in the computer, a transliteration library. The transliteration library includes a portfolio of templating functions in a templating language and a portfolio of reasoning functions in the plain language format. The transliteration library defines a correspondence between each reasoning function of the portfolio of reasoning functions and a selected templating function of the portfolio of templating functions. The method includes, with the computer, automatically generating a templating language representation of the target reasoning graph by correlating the reasoning functions of the target reasoning graph with the templating functions of the portfolio of templating functions corresponding thereto. The method includes outputting the templating language representation of the target reasoning graph.

In an embodiment, a method of automatically outputting transliterations of a target reasoning graph is disclosed. The method includes inputting a target reasoning graph into a computer in data exchange format. The target reasoning graph includes a plurality of leaf nodes each defining an insight, a plurality of reasoning paths each terminating at a leaf node, and a plurality of internal nodes each describing a reasoning function in plain language format, wherein each reasoning function defines a portion of the plurality of reasoning paths and defines queries and inputs for making a discrete decision with reference data at a specific point along a selected reasoning path. The plurality of internal nodes, the plurality of leaf nodes, and the plurality of reasoning functions of the target reasoning graph are in a plain language format. The method includes providing, in the computer, a transliteration library. The transliteration library includes a portfolio of templating functions in a templating language and a portfolio of reasoning functions in the plain language format. The transliteration library defines a correspondence between each reasoning function of the portfolio of reasoning functions and a selected templating function of the portfolio of templating functions. The method includes, with the computer, automatically generating a templating language representation of the target reasoning graph by correlating the reasoning functions of the target reasoning graph with the templating functions of the portfolio of templating functions corresponding thereto. The method includes, with a first compiler, converting the templating language representation of the target reasoning graph into one or more of a high-level programming language representation or a documentation language representation of the target reasoning graph. The method includes, with a second compiler, converting the high-level programming language or the documentation language representation of the target reasoning graph to machine executable code.

In an embodiment, a method of automatically determining an insight using a transliterated target reasoning graph is disclosed. The method includes inputting a target reasoning graph into a computer in data exchange format. The target reasoning graph includes a plurality of leaf nodes each defining an insight, a plurality of reasoning paths each terminating at a leaf node, and a plurality of internal nodes each describing a reasoning function in plain language format, wherein each reasoning function defines a portion of the plurality of reasoning paths and defines queries and inputs for making a discrete decision with reference data at a specific point along a selected reasoning path. The plurality of internal nodes, the plurality of leaf nodes, and the plurality of reasoning functions of the target reasoning graph are in a plain language format. The method includes providing, in the computer, a transliteration library. The transliteration library includes a portfolio of templating functions in a templating language and a portfolio of reasoning functions in the plain language format. The transliteration library defines a correspondence between each reasoning function of the portfolio of reasoning functions and a selected templating function of the portfolio of templating functions. The method includes, with the computer, automatically generating a templating language representation of the target reasoning graph by correlating the reasoning functions of the target reasoning graph with the templating functions of the portfolio of templating functions corresponding thereto. The method includes, with the computer, converting the templating language representation of the target reasoning graph into one or more of a high-level programming language representation or a documentation language representation of the target reasoning graph. The method includes, with at least one compiler, converting the high-level programming language representation of the target reasoning graph to machine executable code. The method includes, with the computer and the machine executable code of the target reasoning graph, determining an insight using the reference data to make each discrete decision corresponding to each reasoning function in the selected reasoning path until the selected reasoning path reaches a selected leaf node corresponding thereto.

In an embodiment, a computer program product for of automatically outputting transliterations of a target reasoning graph is disclosed. The computer program product includes a machine readable program stored on a non-transitory computer readable medium. The machine readable medium includes an input module configured for accepting input of a target reasoning graph in data exchange format. The target reasoning graph includes a plurality of leaf nodes each defining an insight; a plurality of reasoning paths each terminating at a leaf node, and a plurality of internal nodes each describing a reasoning function in plain language format, wherein each reasoning function defines a portion of the plurality of reasoning paths and defines queries and inputs for making a discrete decision with reference data at a specific point along a selected reasoning path. The plurality of internal nodes, the plurality of leaf nodes, and the plurality of reasoning functions of the target reasoning graph are in a plain language format. The machine readable program includes a transliteration library. The transliteration library includes a portfolio of templating functions in a templating language and a portfolio of reasoning functions in the plain language format. The transliteration library defines a correspondence between each reasoning function of the portfolio of reasoning functions and a selected templating function of the portfolio of templating functions. The machine readable program includes a transliteration module for automatically generating a templating language representation of the target reasoning graph by correlating the reasoning functions of the target reasoning graph with the templating functions of the portfolio of templating functions corresponding thereto. The machine readable program includes a reference data library for storing the reference data. The machine readable program includes a first compiler for converting the templating language representation of the target reasoning graph into one or more of a high-level programming language representation or a documentation language representation of the target reasoning graph. The machine readable program includes a second compiler for converting the high-level programming language representation or the documentation language representation of the target reasoning graph into machine executable code. The machine readable program includes an output module for outputting the machine executable code of the target reasoning graph.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

FIG. 2 is a flow chart of a method of automatically outputting transliterations of a target reasoning graph, according to an embodiment.

FIG. 6 is a flow chart of a method of automatically determining an insight using a transliterated target reasoning graph, according to an embodiment.

FIG. 8 is a portal for viewing an insight generated by the systems and methods disclosed herein, according to an embodiment.

DETAILED DESCRIPTION

Figure 1:
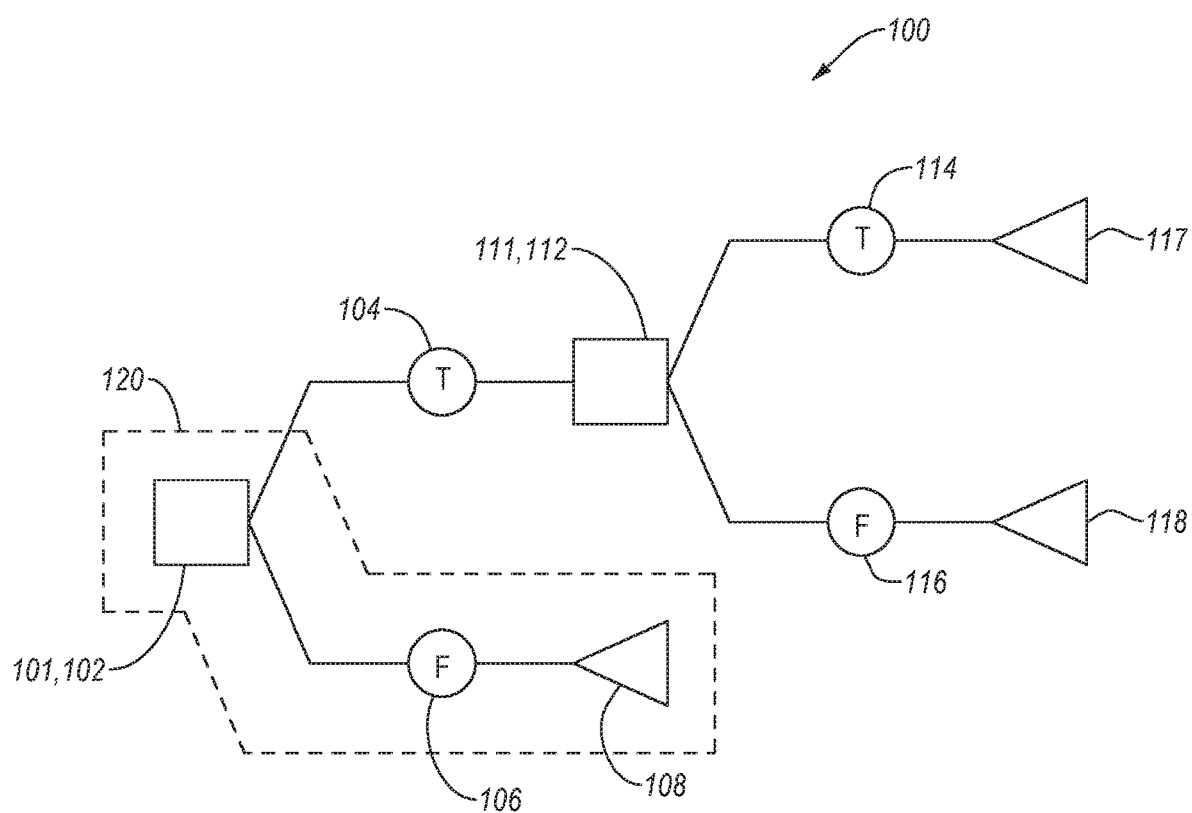
FIG. 1 is a reasoning graph for determining if complying with a request is appropriate, according to an embodiment.

Embodiments disclosed herein relate to methods, computer program products, and systems for generating transliterated reasoning graphs and determining insights using the transliterated reasoning graphs. In one or more embodiments, a target reasoning graph in a first language can be transliterated from the first language to at least a second language using a transliteration library. The first language may be a plain language format such as a high-level programming language or even plain language text and the at least second language may include one or more of a template language, documentation language, a high-level programming language, assembler language, or machine executable code. The transliteration library is utilized to transliterate the target reasoning graph from a first language (e.g., plain language text) to at least a second language (e.g., machine executable code), or to determine an insight using the transliterated target reasoning graph(s).

The methods, computer program products, and systems disclosed herein allow for automatic and fast translation of a reasoning graph from a plain language format to a machine executable language or documentation. For example, the methods, computer program products, and systems disclosed herein may allow input of reasoning graphs in plain language, modular replacement of the reasoning functions therein with templating functions, and translations of the templating functions to a selected format (e.g., high-level programming language, documentation language, or machine executable code), to output or use the reasoning graphs in the selected format. The methods, computer program products, and systems disclosed herein utilize transliteration libraries that correlate templating language code versions of the reasoning functions (e.g., templating functions) with the plain language versions of the reasoning functions. The reasoning functions (in the plain language format) are automatically and modularly substituted with corresponding template code versions of the same. The templating code versions are easily translatable to one or more programming languages, documentation languages, or even machine executable code. Accordingly, the reasoning graph can be input in a plain language and automatically output in a selected high-level programming language, documentation language, or machine executable code.

The reasoning graphs disclosed herein include a plurality of leaf nodes each defining an insight, a plurality of reasoning paths each terminating at a leaf node, and a plurality of internal nodes disposed along the plurality of reasoning paths. The plurality of internal nodes each describe a reasoning function (e.g., in a plain language format such as a high-level programming language or plain language text), wherein each reasoning function defines a portion of the plurality of reasoning paths. Each reasoning function defines queries and inputs for making a discrete decision with reference data at a specific point (e.g., internal node) along the selected reasoning path. In some embodiments, the plurality of internal nodes, the plurality of leaf nodes, and the plurality of reasoning functions of the target reasoning graph may initially be in a first format, such as a plain language format. After processing the reasoning graph in the methods, computer program products, or systems disclosed herein, the reasoning graph may be automatically output or used to determine an insight in at least a second format (e.g., machine executable format, or documentation format).

The reasoning graphs disclosed herein may be transliterated from the first format to the at least a second format using the transliteration library. The transliteration library may include a portfolio of templating functions in a templating language and a portfolio of reasoning functions in the first format (e.g., plain language format). The transliteration library also defines a correspondence between each reasoning function of the portfolio of reasoning functions and a selected templating function of the portfolio of templating functions. A target reasoning graph may be entered in a plain language format and transliterated into a templating language representation of the target reasoning graph using the correspondence of the reasoning functions in the first format with the templating functions. The templating language representation of the target reasoning graph may be converted into one or more of a high-level programming language (e.g., Scala, Ruby, JavaScript, etc.) representation or a documentation language (e.g., HTML, Word, etc.) representation of the target reasoning graph. The high-level programming language representation or a documentation language representation of the target reasoning graph can be converted to assembler code or machine executable code using off-the-shelf compiler(s). The documentation language representation can be displayed on a computer. The machine executable code can be executed in the computer to determine an insight.

Reasoning graphs may be constructed to provide insights (e.g., instructions or answers to over-arching questions) based on selected policies. Reasoning graphs may be used and transliterated in the methods, computer program products, and systems disclosed herein. FIG. 1 is a reasoning graph 100 for determining if complying with a request is appropriate, according to an embodiment. The reasoning graph 100 includes a plurality of internal nodes 101 and 111, and a plurality of leaf nodes 108, 117, and 118. The reasoning graph 100 includes a plurality of reasoning functions 102 and 112 at the internal nodes 101 and 111. Each internal node and associated reasoning function defines a fork in the reasoning graph. Each reasoning function 102 or 112 includes a query and at least two possible discrete decisions (e.g., outcomes at 104 or 106, or 114 or 116 of the respective queries) made at the reasoning function(s) 102 or 112 by answering the respective query with the information contained in reference data (e.g., uniquely identifiable data, look-up tables, form data, etc.). Discrete decision(s) 104 or 106 (e.g., outcome(s) of the reasoning functions) may lead to another reasoning function 112 or to an insight at leaf nodes 108, 117, or 118. For example, the first reasoning function 102 may query as to whether a healthcare provider has submitted a claim for a specific medication. If no claim is submitted, then the discrete decision 106 is a no or false (F) and the reasoning path 120 advances to the insight 108. The insight 108 may include instructions that no action should be taken (e.g., claim should not be paid and/or no prescription should be provided). The reasoning path 120 and/or insight later provided to an entity (e.g., healthcare provider, insured, or insurer) may include the reasoning function 102 at internal node 101 (e.g., query therein), the discrete decision 106, and/or the insight at the leaf node 108.

If a claim was submitted by the healthcare provider, then the query of reasoning function 102 is answered with the discrete decision 104 true (T) or yes and the reasoning path advances to reasoning function 112. At reasoning function 112, the query may be whether or not a diagnosis consistent with the need for the requested mediation is indicated in the reference data (e.g., in medical records or claim header). One of two discrete decisions can be made using the reference data and responsive to the query of the reasoning function 112 at the internal node 111. An affirmative answer or true (T) value in the discrete decision 114 results in the insight at leaf node 117, and a negative answer or false (F) value results in the insight at leaf node 118. The insight at leaf node 117, selected responsive to a true (T) value at 114, may include instructions to pay the claim, provide the prescription for the medication, or determine that proper administrative policies were followed. The insight at leaf node 118, selected responsive to a false (F) value at discrete decision 116, may include instructions that no action should be taken (e.g., claim should not be paid and/or no prescription should be provided).

Each of the plurality of reasoning functions 102 and 112 at the internal nodes 101 and 111 defines criteria for making a discrete decision 104, 016, 114, or 116 (made using at least some of the reference data) at a respective fork in the reasoning graph 100 (e.g., a point along a reasoning path 120). Each of the reasoning functions 102 and 112 may direct a reasoning path in a selected direction through the reasoning graph 100 to arrive at an insight at a respective leaf node 108, 117, or 118. Accordingly, the reasoning path includes only those reasoning functions and discrete decisions used in determining the insight (e.g., arriving at the leaf node). The reasoning path may include discrete portions including one or more reasoning functions and corresponding discrete decisions based on reference data. The discrete portions may also include insights. The reasoning graph(s) may include a plurality of reasoning paths each of which include a plurality of reasoning functions and terminate in one of the plurality of leaf nodes. The leaf node is a terminal node of the reasoning graph and defines an insight. The insight may be an answer to an overarching question for which each of the reasoning functions provide a portion of the criteria used to arrive at the answer (e.g., insight) to the overarching question.

In some embodiments, the insight may be identified at the leaf node by an insight identifier (insight ID). The insight ID may encode the reasoning path such as described in U.S. patent application Ser. No. 15/610,945, filed Jun. 1, 2017, which is incorporated herein, by this reference, in its entirety for any purpose. The reasoning path to a specific insight at a specific leaf node may be unique and, therefore, may have a unique insight ID provided at the leaf node. For example, in acyclic, directed reasoning graphs, each insight or leaf node can be reached by only a single reasoning path, which can be identified by the insight ID. In some embodiments, only the insight or only the reasoning path to the insight (including the reasoning functions) may be divulged or disclosed (e.g., output or documented). In some embodiments, the entire reasoning graph including the reasoning functions, the reference data used to respond to the reasoning functions in the reasoning path, and the insights at the leaf nodes may be disclosed. Accordingly, selected portions of the reasoning graph relevant to the insight may be divulged to an entity (e.g., insured, insurer, or medical provider). Each insight at leaf nodes 108, 117, or 118 may include the insight ID, which encodes the reasoning path used to reach the insight at the leaf nodes 108, 117, or 118 therein as disclosed in U.S. patent application Ser. No. 15/610,945, which is incorporated herein. For example, the insight ID for the insight at leaf node 108 includes the reasoning path 120, and each of reasoning function 102 and discrete decision therein 106.

As noted above, different criteria or constraints may be used in different reasoning functions. For example, as shown above, some reasoning functions may be based on a binary, affirmative or negative decision to query. Some reasoning functions may be based on quantitative measures, such as amounts and thresholds or limits associated therewith. Such reasoning functions may include a maximum or minimum value constraint. The quantitative measures may be located in the reference data, which may be accessed to answer the queries of the reasoning functions.

In contrast to a diagnosis constraint (e.g., affirmative or negative decisions) as explained with respect to FIG. 1, in some embodiments, a maximum or minimum value constraint, a waste constraint, or any other suitable constraint may be used in a reasoning function.

The reasoning graph 100 in FIG. 1 is an example and may represent a simplified reasoning graph. In reasoning graphs that contain more than one reasoning function prior to the leaf node 108 (e.g., insight), the reasoning paths therein may include a plurality of internal nodes (e.g., reasoning functions) which form each unique reasoning path to each leaf node (e.g., insight). In some embodiments, reasoning graphs may include any number of intermediate nodes (and corresponding reasoning functions), discrete decisions, and leaf nodes (and corresponding insights). Exemplary reasoning graphs may have any number of reasoning functions and/or insights therein, such as at least 2 reasoning functions and at least 3 insights. For example, a reasoning graph may include about 2 reasoning functions to about 1000 reasoning functions, such as 3 to 100, 5 to 50, 2 to 20, 10 to 100, 20 to 100, less than 100, less than 50, or less than 20 reasoning functions. In some embodiments, a reasoning graph may include any number of insights, such as 2 insights to about 1000 insights, such as 3 to 100, 5 to 50, 2 to 20, 10 to 100, 20 to 100, less than 100, less than 50, or less than 20 insights. In some embodiments, the number of possible insights on a reasoning graph may be n+1, where n is the number of reasoning functions. Various aspects of exemplary reasoning graphs and portions thereof may be as disclosed in U.S. patent application Ser. No. 15/610,945, which is incorporated herein.

While depicted as binary decisions, the reasoning graphs may not include solely binary decisions of reasoning functions. A reasoning function may include two or more discrete decisions or outcomes. For example, reasoning functions may include quantitative queries, which include two or more discrete decisions based on a quantity identified in the reference data corresponding to the query. In some embodiments, the reasoning graphs are provided or built in plain language format (e.g., text or high-level programming language). The methods, computer program products, and systems disclosed herein may transliterate the plain language format to machine readable and executable code and one or more computer systems may run the reasoning functions and queries, and provide the discrete decisions and insights.

Reasoning functions may include a query and criteria for determining an outcome of the query, such as a threshold value or a binary absence or presence of a condition. Accordingly, the outcomes of reasoning functions can be based on qualitative and/or quantitative criteria. For example, a query of a reasoning function may set a threshold level of the number of times an individual has triggered a certain condition (e.g., has been prescribed a certain medication), and reference data corresponding to an individual who has requested the condition again (e.g., submitted a claim for said medication) may indicate that the number of times the individual has triggered the certain condition is in excess of the threshold level. The discrete decision associated with the threshold value of the reasoning function may dictate that the next step(s) in the reasoning path travel through one or more reasoning functions designed to determine if the individual may be better served by a different treatment, should be covered under a policy, or is obtaining an amount of medication that is indicative of addiction or fraud.

Each reasoning function can be written (e.g., encoded into a machine readable and executable program) according to a policy. Policies can include one or more of governmental instructions or recommendations, such as FDA recommendations, FHA guidelines, or state or federal statutes; professional guides such as the pharmaceutical compendia, procedure manuals for medical practices, underwriting guide books; or internal criteria, such as underwriting polices, accounting policies, or target amounts/guidelines. The reasoning functions can each be written to incorporate different criteria of a policy in queries directed to determining if a particular insight is applicable to the reference data or individual(s) related thereto (e.g., a particular action should or should not be taken). The cumulative outcomes or discrete decisions of the reasoning functions in each reasoning path define how or which insight is reached. Each reasoning function informs a subsequent reasoning function and the eventual insight. Each reasoning function queries some portions of a larger question that is answered at an insight. For example, the insight may include a healthcare related outcome and each of the reasoning functions may include a healthcare-related query and/or decision, such as, was the patient diagnosed with a condition associated with a prescribed medication and has the patient been prescribed the same medication by another provider or more than once within an impermissible time frame.

An insight may include a final determination or conclusion that: an outcome falls within a set of coverage criteria, the outcome falls outside of the set of coverage criteria, a healthcare-related expense will or will not be covered, the individual should or should not receive the selected procedure, the individual should or should not receive a selected medication; a medical professional is committing fraud or malpractice, the individual is committing fraud, a unique entity should or should not receive financial assistance (e.g., a loan, a grant, etc.), the unique entity does or does not qualify for an economic benefit (e.g., tax exemption, charitable status, etc.), or any other determination or conclusion.

In some embodiments, the insight(s) includes a final determination or conclusion about the propriety of a decision associated with the reference data. For example, the reference data or information attributable to the unique entity may include protected health information or personally identifiable information and the insight may include a determination of propriety of a decision associated therewith, such as propriety of a recommended procedure or medication, or interest amount on a loan.

While healthcare related embodiments are provided as examples herein, in some embodiments, other types of reasoning functions and may be used with the reference data. For example, financial related reasoning functions may be provided and used, such as a reasoning function for determining if an entity qualifies for a loan or rate, for determining when to foreclose on an asset, for determining when to move capital from or into a fund, etc. In such embodiments, the reference data (e.g., including at least some uniquely identifiable data) may include personally identifiable financial information that may be regulated by privacy of consumer financial information rules or personally identifiable data that may be subject to HIPAA constraints.

FIG. 2 is a flow chart of a method 200 of automatically outputting transliterations of a target reasoning graph, according to an embodiment. The method 200 includes an act 210 of inputting a target reasoning graph into a computer; an act 220 of providing, in the computer, a transliteration library; an act 230 of, with the computer, automatically generating a templating language representation of the target reasoning graph by correlating the reasoning functions of the target reasoning graph with the templating functions of the portfolio of templating functions corresponding thereto; and an act 240 of outputting the templating language representation of the target reasoning graph. The method 200 may take as input, a target reasoning graph in a first format (e.g., programming language or even plain language text), transliterate the target reasoning graph into a templating language, and output the transliterated target reasoning graph in the templating language. The method 200 can be accomplished using a computer system and one or more compilers.

The method 200 includes the act 210 of inputting a target reasoning graph into a computer. Target reasoning graphs may include a plurality of leaf nodes each defining an insight, a plurality of reasoning paths each terminating at a leaf node, and a plurality of internal nodes each describing a reasoning function in plain language format. The leaf nodes (and/or associated insight), the internal nodes, and the reasoning functions may be similar or identical to any leaf node (and/or associated insight), internal node, or reasoning function disclosed herein. Each reasoning function of the target reasoning graph defines a portion of the plurality of reasoning paths of the target reasoning graph and defines queries and inputs for making a discrete decision with reference data at a specific point along a selected reasoning path of the target reasoning graph. The plurality of internal nodes, the plurality of leaf nodes, and the plurality of reasoning functions of the target reasoning graph may be in a plain language format (e.g., human readable format such as a first high-level programming language format). The target reasoning graph may be provided in the data exchange format. For example, inputting the target reasoning graph into the computer may include inputting the target reasoning graph into the computer in data exchange format, such as JSON, XML, or any other suitable data exchange format. In some embodiments, inputting the target reasoning graph into the computer may include inputting the target reasoning graph into the computer via a network connection, a communication port, a keyboard, a disk, or any other suitable input means.

In some embodiments, the target reasoning graph (e.g., provided in data exchange format) may be a human readable text or high-level programming language representation of a reasoning graph for determining an overarching question (e.g., does an individual qualify for coverage, a treatment, or financial aid). The target reasoning graph can include any of the reasoning graphs disclosed herein, such as including any number of internal nodes and leaf nodes disclosed herein. The target reasoning graph may be input into computer system (in data exchange format) by a user. The target reasoning graph may be constructed in the plain language format such as high-level programming language format, by a user. In some embodiments, the plain language format (e.g., high-level programming language format) may be converted to data exchange format prior to input into the computer system.

The target reasoning graphs disclosed herein may include a plurality of target reasoning functions (e.g., reasoning functions specifically correlating to reasoning functions of the target reasoning graph) and target insights (e.g., insights specifically correlating to the target leaf nodes of the target reasoning graph).

The method 200 includes the act 220 of providing, in the computer, a transliteration library. The act 220 of providing, in the computer, a transliteration library may include inputting or accessing the transliteration library in the computer. The transliteration library may include a portfolio of templating functions in a templating language and a portfolio of reasoning functions in the plain language format (such as plain language text or high-level programming language format). The transliteration library defines a correspondence (e.g., a correlation or relationship) between each reasoning function of the portfolio of reasoning functions and a selected templating function of the portfolio of templating functions.

Figure 3:
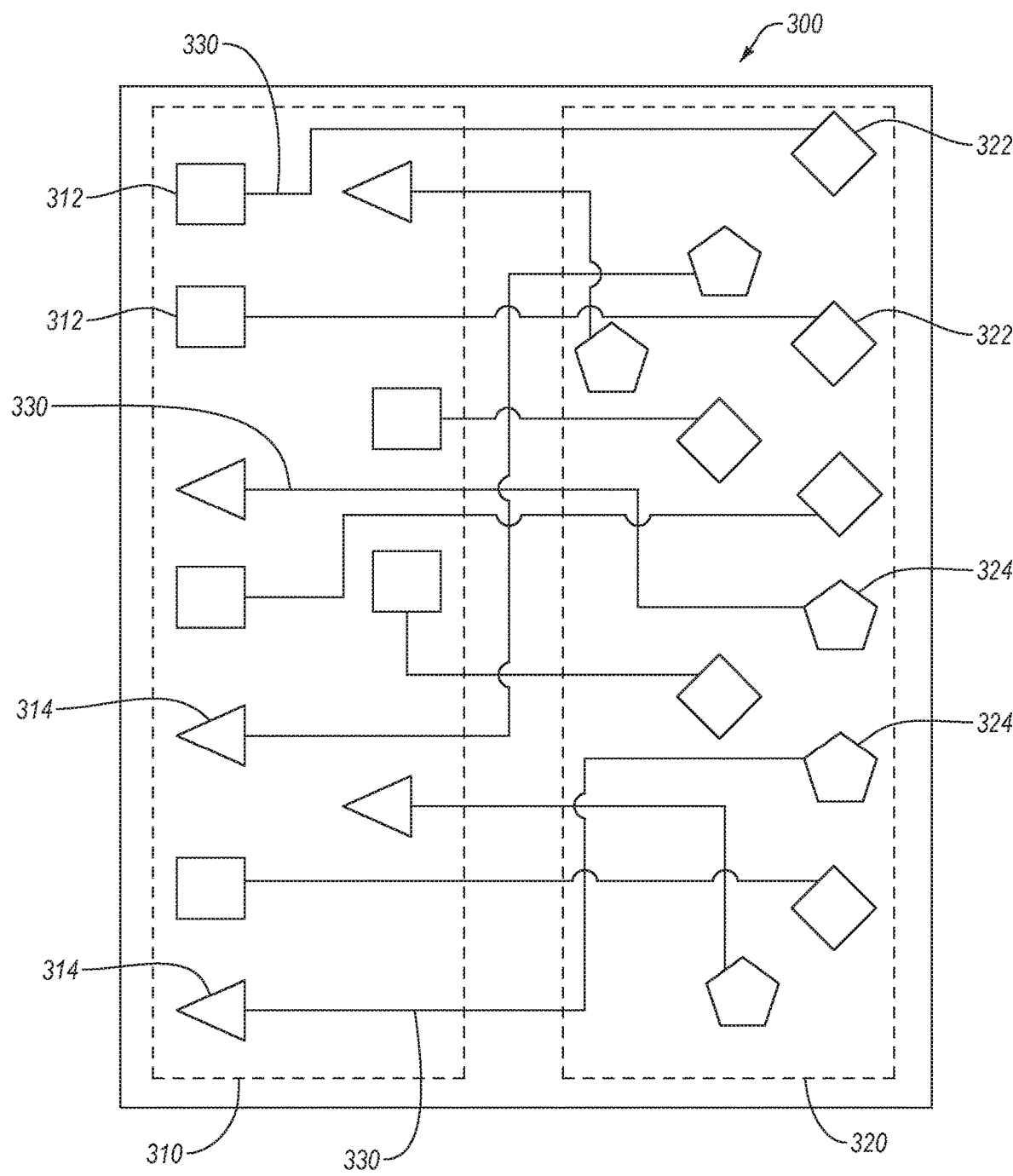
FIG. 3 is a block diagram of a transliteration library, according to an embodiment.

FIG. 3 is a block diagram of a transliteration library 300, according to an embodiment. As shown in FIG. 3, the transliteration library 300 includes the portfolio of reasoning functions 310 and the portfolio of templating functions 320. The portfolio of reasoning functions 310 may include the plurality of reasoning functions 312 each in plain text format or high-level programming language format (e.g., human readable format). The reasoning functions 312 may include a query and criteria for determining the query. The criteria for determining the outcome of the query may include permissible ranges (e.g., dates, amounts, etc.) to satisfy the query, calls for relevant reference data used to determine the query, etc. For example, at least some of the reasoning functions 312 may include a query for a date of service and a criteria that the date of service must be after an enrollment date. In some embodiments, at least some of the reasoning functions 312 may include a query for an amount (e.g., amount of a prescribed medication over a period of time, amount of debt, amount billed, etc.) and a criteria that the amount must be below a maximum, above a minimum, or otherwise be within some range. The queries and criteria disclosed above are merely embodiments, and further example reasoning functions 312 may include different queries and criteria for determining an outcome (e.g., discrete decision) of the reasoning functions 312 than those disclosed above. In some examples, the criteria may be built into the query, such as "does the diagnosis include one of the following National Correct Coding Initiative codes, A, B, C, or D?"

In some embodiments, the portfolio of reasoning functions 310 may include a plurality of insights 314 each in plain text format or high-level programming language format (e.g., human readable format). The insights 314 may each include an indication of at least a portion of the reasoning path used to reach the respective insights 314 (including the reasoning functions 312 therein). Accordingly, the insights 314 and reasoning functions 312 may be used to form a reasoning graph via association of the reasoning functions 312 in a respective reasoning path as indicated at the insights 314 (e.g., via an insight identifier), or by direct correlation of the target reasoning functions 312 and insights 314 in the target reasoning graph. The insights provide a determination of the overarching question addressed by the reasoning graphs (e.g., target reasoning graph).

The transliteration library 300 includes the portfolio of templating functions 320. The portfolio of templating functions 320 includes the plurality of templating functions 322. The plurality of templating functions 322 are reasoning functions in the templating language format. At least some of the templating functions 322 may include call-outs or links to criteria such as reference data (e.g., look-up tables, databases, libraries, spreadsheets, forms, codes, etc.) used to answer a query. For example, a call-out or link to a database containing account information or form data may be encoded in the templating functions 322. In some embodiments, at least some of the reference data may be provided with or in the transliteration library 300. For example, a database of National Correct Coding Initiative codes and their corresponding diagnoses may be provided with or in the transliteration library. Each of the templating functions 322 may include a reasoning function represented in one or more templating languages such as one or more of ECT, Embedded JS, FreeMarker, Handlebars, Jade, Mustache, PlannerFw, String, Template7, Underscore, Velocity, or any other suitable templating language.

In some embodiments, the portfolio of templating functions 320 may include a plurality of insights 324 each in templating language format. The plurality of insights 324 may each include an indication of at least a portion of the reasoning path used to reach the respective insights 324 (including the templating functions 322 therein). Accordingly, the insights 324 and templating functions 322 may be used to form a reasoning graph via association of the templating functions 322 in a respective reasoning path as indicated at the insights 324 (e.g., via an insight identifier), or by direct correlation to the corresponding reasoning functions 312 and insights 314 in the target reasoning graph. The insights 324 provide a determination of the overarching question addressed by the reasoning graphs (e.g., target reasoning graph).

The transliteration library 300 includes a plurality of correlations 330 between the reasoning functions 310 and templating functions 320. The correlations 330 provide a 1:1 relationship between reasoning functions 312 and the respective templating functions 322 corresponding thereto. For example, the correlation 330 may provide instructions to substitute the templating function 322 (e.g., reasoning function in templating format) for the reasoning function 312 (e.g., in plain language format such as high-level programming language format). The transliteration library 300 includes a plurality of correlations 330 between the insights 314 (in plain language format) and the insights 324 (in the templating language). The correlations 330 provide a 1:1 relationship between insights 314 and the respective insights 324 (in the templating language) corresponding thereto. For example, the correlation 330 may provide instructions to substitute the insight 324 (e.g., insight in templating format) for the insight 314 (e.g., in plain language text or high-level programming language format).

In some embodiments, the correlations 330 may include one or more structures, such as the structure of the target reasoning graph, which may include one or more reasoning paths and relative positions of the internal nodes (e.g., reasoning functions) and leaf nodes (e.g., insights) of the target reasoning graph.

The templating language format of the reasoning graph may be a more readily convertible format to one or more additional languages/formats than the plain language text or high-level programming language of the reasoning functions 312. For example, rather than manually converting a plain language representation of a reasoning graph (e.g., first high-level programming language) to a selected high-level programming language or machine readable code, the plain language representation of the reasoning functions 312 may be converted to templating functions 322 with the transliteration library 300. The templating functions 322 of the templating language representation of the target reasoning graph may be converted to one or more selected high-level programming languages or even machine readable code using one or more standard compilers.

Returning to FIG. 2, the method 200 includes the act 230 of, with the computer, automatically generating a templating language representation of the target reasoning graph by correlating the reasoning functions of the target reasoning graph with the templating functions of the portfolio of templating functions corresponding thereto. In some embodiments, automatically generating a templating language representation of the target reasoning graph by correlating the reasoning functions of the target reasoning graph with the templating functions of the portfolio of templating functions corresponding thereto may include replacing (e.g., automatically) the reasoning functions (e.g., plain language text or high-level programming language representations of the reasoning functions) with templating functions (e.g., templating language representations of the reasoning functions). Replacing the reasoning functions with the templating functions may be carried out in a modular manner, whereby each individual reasoning function in the reasoning graph is substituted with a corresponding templating function. Accordingly, a single transliteration library may be used to transliterate any number of reasoning graphs that may contain any number of different (e.g., noncommon) reasoning functions. In some embodiments, automatically generating a templating language representation of the target reasoning graph by correlating the reasoning functions of the target reasoning graph with the templating functions of the portfolio of templating functions corresponding thereto may include outputting the templating language representation (e.g., templating functions and insights) in the templating language. The act 230 may include automatically generating a templating language representation of the target reasoning graph by correlating the reasoning functions of the target reasoning graph with the templating functions of the portfolio of templating functions corresponding thereto with a computer program product adapted to carry out the same, where the computer program product is stored on the computer (e.g., in the memory or storage device therein).

In some embodiments, the templating language may include ECT, Embedded JS, FreeMarker, Handlebars, Jade, Mustache, PlannerFw, String, Template7, Underscore, Velocity, or any other suitable templating language. The templating language representation of the target reasoning graph may include a plurality of target reasoning functions (e.g., reasoning functions directly correlating to the target reasoning graph) from the portfolio of reasoning functions represented as templating functions of the target reasoning graph. The templating language representation of the target reasoning graph may be in ECT, Embedded JS, FreeMarker, Handlebars, Jade, Mustache, PlannerFw, String, Template7, Underscore, Velocity, or any other suitable template (e.g., templating language).

In some embodiments, the templating language representation of the target reasoning graph may include one or more links to, or, the reference data for defining inputs in one or more of the reasoning functions. For example, the templating language representation of the target reasoning graph may include a call-out, link, or location of a database, form, or look-up table containing reference data used to answer the query of the templating function(s) (e.g., the reasoning function(s)) in the reasoning graph. In some embodiments, the reference data may define one or more inputs for making a discrete decision at the reasoning function(s) represented by the templating function(s) in the templating language representation of the target reasoning graph. For example, the reference data may include look-up tables, databases, libraries, spreadsheets, forms, codes, laws, policies, directives, etc., each in electronic form. The reference data may include account information such as opening dates of accounts, amounts in accounts, usage of accounts, etc.; personally identifiable information such as name, date, birthdate, address, etc.; health information such as diagnoses, medical history, medications, procedures, dates of any of the foregoing, etc.; policy limits or ranges; legal limits or ranges; National Correct Coding Initiative codes; etc.; each in electronic form.

The templating language representation of the target reasoning graph may provide a more universally translatable version for the target reasoning graph and components thereof than the same reasoning graph in plain language text or high-level programming language format. The templating language representation of the target reasoning graph may be compiled into a high-level programming language, which may be further compiled into a machine executable code (e.g., an assembly language or bytecode).

The method 200 includes the act 240 of outputting the templating language representation of the target reasoning graph. Outputting the templating language representation of the target reasoning graph may include outputting the templating language representation of the target reasoning graph to a computer or a component thereof (e.g., to a memory or storage medium of the computer). In some embodiments, outputting the templating language representation of the target reasoning graph may include providing the templating language representation of the target reasoning graph to a compiler. In some embodiments, outputting the templating language representation of the target reasoning graph may include outputting the templating language representation of the target reasoning graph with one or more links to reference data used to answer the queries of the reasoning functions therein. The transliterated target reasoning graph in the templating language can be used to generate representations of the target reasoning graph in a new format (e.g., second high-level programming language or documentation language), and convert the new format into machine executable code. As explained in more detail below, the templating language representation of the target reasoning graph may be used to generate one or more of a documentation language representation, high-level programming language representation, assembly language representation, or machine executable code representation of the target reasoning graph.

In some embodiments, the method 200 may include converting the templating language representation of the target reasoning graph into at least one of one or more documentation language representations of the target reasoning graph or one or more high-level programming language representations of the target reasoning graph. For example, the method 200 may include, with the computer, automatically generating a documentation language representation of the target reasoning graph. In some embodiments, automatically generating a documentation language representation of the target reasoning graph may include converting the templating language representation of the target reasoning graph into one or more of CSS, HTML, Javascript, SGML, XML or variants thereof, XSL, or any other suitable documentation language, such as with a compiler. For example, the templating language representation of the target reasoning graph may be converted to the documentation language representation of the target reasoning graph using a compiler configured, programmed, or adapted to compile the templating language to the documentation language. In some embodiments, the method 200 may include displaying the documentation language representation of the target reasoning graph, such as on a display (e.g., computer screen, smart phone screen, tablet, etc.). In some embodiments, automatically generating a documentation language representation of the target reasoning graph may include converting the templating language representation of the target reasoning graph into one or more of one or more of Microsoft Word, Google docs, OpenOffice, PDF, Lotus, Textmaker, or LibreOffice formats or any other suitable documentation language. In some embodiments, the method 200 may include displaying the documentation language representation of the target reasoning graph, such as in Microsoft Word, Google docs, OpenOffice, PDF, Lotus, Textmaker, or LibreOffice formats (e.g., on a computer screen, smart phone screen, tablet, etc.).

In some embodiments, the method 200 may include converting the templating language representation of the target reasoning graph into one or more high-level programming language representations of the target reasoning graph, such as with a compiler. For example, the templating language representation of the target reasoning graph may be converted to the (second) high-level programming language representation of the target reasoning graph using a compiler configured, programmed, or adapted to compile the templating language to the (second) high-level programming language. The one or more (second) high-level programming language representations of the target reasoning graph may be different than the plain language text representation or (first) high-level representation of the target reasoning graph input into the computer. Accordingly, the target reasoning graph may be automatically transliterated to a different high-level programming language without the necessity of manually coding in the different (e.g., second) high-level programming language. The compiler may be used to compile the templating language representation of the target reasoning graph into the one or more high-level programming languages. In some embodiments, the one or more high-level programming languages may include one or more of into one or more of C, C++, Clojure, Go, Java, Javascript, Python, Ruby, Scala, or any other suitable high-level programming language. For example, converting the templating language representation of the target reasoning graph into one or more high-level programming languages may include converting the templating language into one or more of C, C++, Clojure, Go, Java, Javascript, Python, Ruby, or Scala, with a compiler.

In some embodiments, the method 200 may include converting the one or more high-level programming language representations of the target reasoning graph (e.g., converted from the templating language representation of the target reasoning graph) to an assembly language representation of the target reasoning graph, such as with a standard compiler. For example, converting the one or more high-level programming language representations of the target reasoning graph to an assembly language representation of the target reasoning graph may include using a standard compiler to compile the one or more high-level programming language representations of the target reasoning graph to the assembly language representation of the target reasoning graph. In some embodiments, the assembly language may include one or more of ARM, MIPS, x86, or any other suitable assembly language. In some embodiments, the method 200 may include converting the one or more high-level programming language representations of the target reasoning graph (e.g., converted from the templating language representation of the target reasoning graph) to a virtual machine code representation of the target reasoning graph, such as to Java bytecode or any other suitable virtual machine code with a virtual machine code compiler. Accordingly, in some embodiments, the machine executable code may include one or more of assembly language (e.g., code) or bytecode. In some embodiments, the assembly language representation or virtual machine code representation of the target reasoning graph may be computer readable and executable as, or be readily compiled to, machine executable code.

In some embodiments, the method 200 may include converting the assembly language representation of the target reasoning graph into machine executable code, such as with an additional compiler (e.g., separate from the assembly code compiler). In some embodiments, the converting the assembly language representation of the target reasoning graph into machine executable code may include running the assembly language representation of the target reasoning graph (e.g., as converted from the high-level programming language representation of the target reasoning graph, which is converted from the templating language representation of the target reasoning graph) through the compiler to generate machine executable code, microcode, or bytecode. In some embodiments, the method 200 may include directly converting the templating language representation of the target reasoning graph into machine executable code, such as with an additional compiler (e.g., separate from the assembly code compiler).

Figure 4:
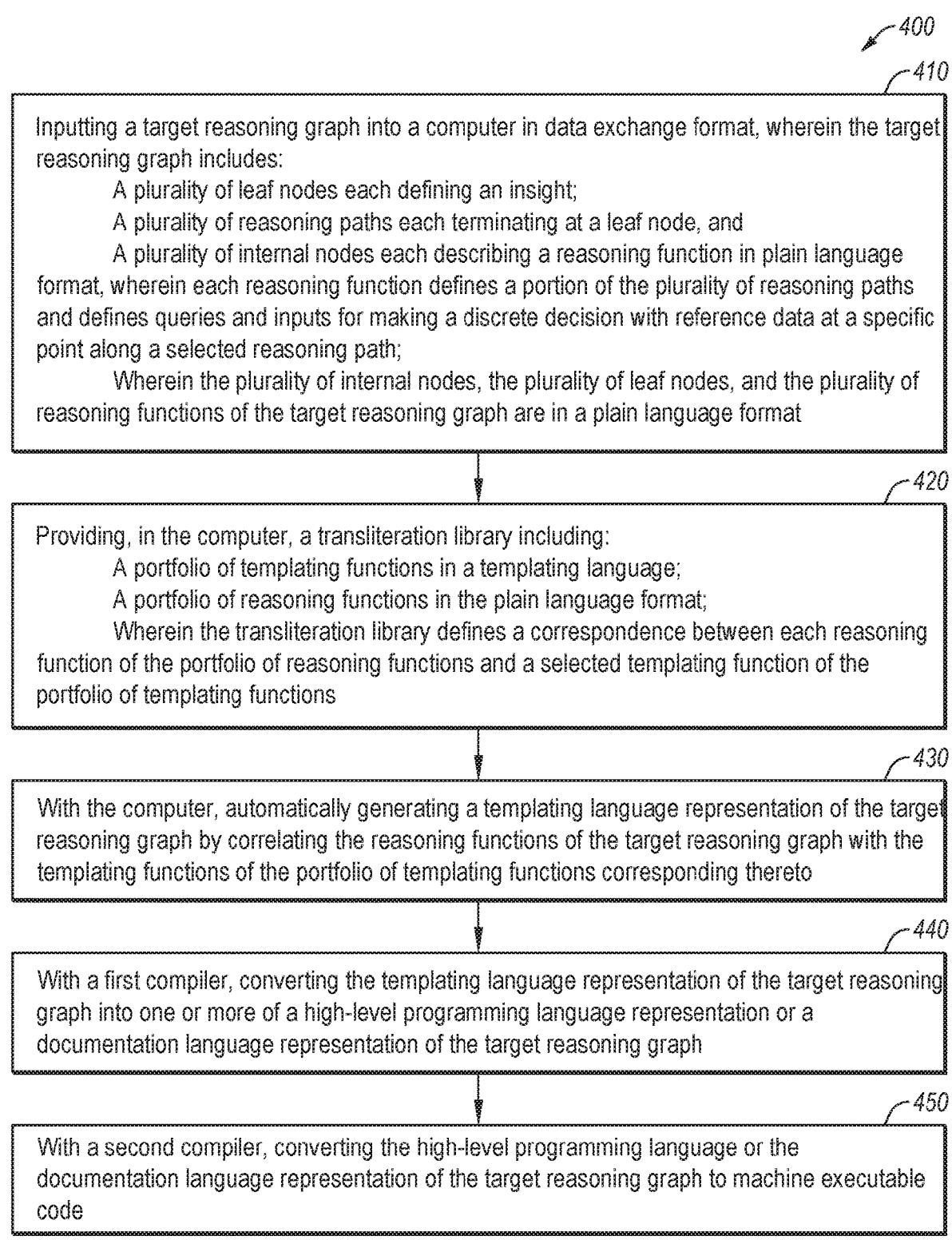
FIG. 4 is a flow chart of a method of automatically outputting transliterations of a target reasoning graph, according to an embodiment.

FIG. 4 is a flow chart of a method 400 of automatically outputting transliterations of a target reasoning graph, according to an embodiment. The method 400 includes an act 410 of inputting a target reasoning graph into a computer in data exchange format; an act 420 of providing, in the computer, a transliteration library; an act 430 of, with the computer, automatically generating a templating language representation of the target reasoning graph by correlating the reasoning functions of the target reasoning graph with the templating functions of the portfolio of templating functions corresponding thereto; an act 440 of, with a first compiler, converting the templating language representation of the target reasoning graph into one or more of a high-level programming language representation or a documentation language representation of the target reasoning graph; and an act 450 of, with a second compiler, converting the high-level programming language or the documentation language representation of the target reasoning graph to machine executable code. The method 400 may take as input, a target reasoning graph in a first format (e.g., first programming language or plain language text), transliterate the target reasoning graph into a templating language, generate representations of the target reasoning graph in a new format (e.g., second programming language or documentation language), and convert the new format into machine executable code. The method 400 can be accomplished using a computer system and one or more compilers.

The method 400 includes an act 410 of inputting a target reasoning graph into a computer in data exchange format. The target reasoning graph may be similar or identical to any target reasoning graph disclosed herein. For example, the target reasoning graph may include a plurality of leaf nodes each defining an insight, a plurality of reasoning paths each terminating at a leaf node, and a plurality of internal nodes each describing a reasoning function in plain language format. Each reasoning function in the target reasoning graph defines a portion of the plurality of reasoning paths and defines queries and inputs for making a discrete decision with reference data at a specific point (e.g., internal node) along a selected reasoning path. The plurality of internal nodes, the plurality of leaf nodes, and the plurality of reasoning functions of the target reasoning graph in the data exchange format may be in a plain language format (e.g., human readable text or programming language).

In example, the act 410 of inputting a target reasoning graph into a computer in data exchange format may be similar to the act 210 described herein in one or more aspects. For example, inputting a target reasoning graph into a computer in data exchange format may include inputting the target reasoning graph into the computer in JSON, XML, or any other suitable data exchange format. In some embodiments, inputting the target reasoning graph into the computer in data exchange format may include inputting the target reasoning graph into the computer via a network connection, a communication port, a keyboard, a disk, or any other suitable input means. In some embodiments, inputting the target reasoning graph into the computer may include inputting the target reasoning graph into the computer in a format other than a data exchange format, such as plain language format, high-level programming language format, or any other suitable format.

The method 400 includes an act 420 of providing, in the computer, a transliteration library. The transliteration library may include a portfolio of templating functions in a templating language and a portfolio of reasoning functions in the plain language format. The transliteration library defines a correspondence between each reasoning function of the portfolio of reasoning functions and a selected templating function of the portfolio of templating functions. The transliteration library, portfolio of templating functions, portfolio of reasoning functions, and correspondence(s) between each reasoning function of the portfolio of reasoning functions and a selected templating function of the portfolio of templating functions may be similar or identical to any transliteration library, portfolio of templating functions, portfolio of reasoning functions, or correspondence(s) described herein. For example, the transliteration library may be similar or identical to the transliteration library 300 disclosed herein, in one or more aspects (e.g., the portfolio of reasoning functions 310, the portfolio of templating functions 320, and plurality of correlations 330).

The act 420 of providing, in the computer, a transliteration library may be similar or identical to the act 220 of providing, in the computer, a transliteration library, in one or more aspects. The portfolio of reasoning functions may include a plurality of reasoning functions and a plurality of insights each in plain text format or high-level programming language format (e.g., a human readable format). The insights and reasoning functions may be used to form a reasoning graph in the templating language format via direct correlation of the reasoning functions in the target reasoning graph with corresponding (e.g., correlated) templating functions in the portfolio of templating functions. The transliteration library includes the portfolio of templating functions. The portfolio of templating functions includes a plurality of templating functions each representing one of the reasoning functions in the templating language format. For example, each of the templating functions may include a reasoning function represented in one or more of ECT, Embedded JS, FreeMarker, Handlebars, Jade, Mustache, PlannerFw, String, Template7, Underscore, Velocity, or any other suitable templating language (e.g., template).

In some embodiments, at least some of the templating functions in the portfolio of templating functions may include call-outs or links to criteria such as reference data (e.g., look-up tables, databases, libraries, spreadsheets, forms, codes, etc.) used to answer a query. For example, a call-out or link to a database containing account information or form data may be encoded in the templating functions. In some embodiments, at least some of the reference data may be provided with or in the transliteration library. For example, a database of National Correct Coding Initiative codes and their corresponding diagnoses may be provided with or in the transliteration library.

In some embodiments, the correlations in the transliteration library may include one or more structures (e.g., blank reasoning graph templates or reasoning function groups that follow a specific logical structure), such as the structure of the target reasoning graph, which may include one or more reasoning paths and relative positions of the internal nodes (e.g., reasoning functions) and leaf nodes (e.g., insights) of the target reasoning graph.

The templating language format of the target reasoning graph may be a more readily convertible format to one or more additional languages/formats than the plain language text or high-level programming language of the reasoning functions. For example, rather than manually converting (e.g., coding) a plain language representation of the target reasoning graph to a selected high-level programming language or machine readable code, the plain language representation of the reasoning functions may be converted to templating functions using the transliteration library. The templating functions of the templating language representation of the target reasoning graph may be converted to one or more selected high-level programming languages or even machine readable code using one or more standard compilers.

The method 400 includes an act 430 of, with the computer, automatically generating a templating language representation of the target reasoning graph by correlating the reasoning functions of the target reasoning graph with the templating functions of the portfolio of templating functions corresponding thereto. In some embodiments, the act 430 of, with the computer, automatically generating a templating language representation of the target reasoning graph by correlating the reasoning functions of the target reasoning graph with the templating functions of the portfolio of templating functions corresponding thereto may be similar or identical to the act 230 disclosed herein, in one or more aspects. For example, automatically generating a templating language representation of the target reasoning graph by correlating the reasoning functions of the target reasoning graph with the templating functions of the portfolio of templating functions corresponding thereto may include replacing the reasoning functions with templating functions. Replacing the reasoning functions with the templating functions may be carried out in a modular manner, whereby each individual reasoning function in the reasoning graph is substituted with a corresponding templating function. Accordingly, a single transliteration library may be used to transliterate any number of reasoning graphs that may contain any number of different (e.g., noncommon) reasoning functions. The act 430 may include automatically generating a templating language representation of the target reasoning graph by correlating the reasoning functions of the target reasoning graph with the templating functions of the portfolio of templating functions corresponding thereto with a computer program product adapted to carry out the same, where the computer program product is stored on the computer.

In some embodiments, automatically generating a templating language representation of the target reasoning graph by correlating the reasoning functions of the target reasoning graph with the templating functions of the portfolio of templating functions corresponding thereto includes outputting the templating language representation in the templating language. In some embodiments, the templating language may include ECT, Embedded JS, FreeMarker, Handlebars, Jade, Mustache, PlannerFw, String, Template7, Underscore, Velocity, or any other suitable templating language. For example, the templating language representation of the target reasoning graph may be in ECT, Embedded JS, FreeMarker, Handlebars, Jade, Mustache, PlannerFw, String, Template7, Underscore, Velocity, or any other suitable template (e.g., templating language).

In some embodiments, automatically generating a templating language representation of the target reasoning graph by correlating the reasoning functions of the target reasoning graph with the templating functions of the portfolio of templating functions corresponding thereto may include outputting the templating language representation of the target reasoning graph with one or more links to, or, at least some of the reference data for defining inputs in one or more of the target reasoning functions. For example, the templating language representation of the target reasoning graph may include one or more links to, or, the reference data for defining inputs in one or more of the reasoning functions. The templating language representation of the target reasoning graph may include a call-out, link, or location of a database, form, or look-up table containing reference data used to answer the query of the templating function(s) (e.g., the reasoning function(s)) in the target reasoning graph. In some embodiments, the reference data may be similar or identical to any of the reference data disclosed herein.

The templating language representation of the target reasoning graph may provide a more universally translatable version for the target reasoning graph and components thereof than the same reasoning graph in plain language text or high-level programming language format. The templating language representation of the target reasoning graph may be compiled into a high-level programming language, which may be further compiled into a machine executable code (such as via an assembly language).

The method 400 includes an act 440 of, with a first compiler, converting the templating language representation of the target reasoning graph into one or more of a high-level programming language representation or a documentation language representation of the target reasoning graph. In some embodiments, converting the templating language representation of the target reasoning graph into one or more of the high-level programming language representation or the documentation language representation of the target reasoning graph may include compiling the templating language representation of the target reasoning graph into one or more of the high-level programming language representation or a documentation language representation of the target reasoning graph with the first compiler. The first compiler may be stored in the computer, such as in the memory, storage medium, or processor cache therein. The first compiler may be programmed to compile the templating language to the high-level programming language or the documentation language. For example, the first compiler may be programmed to compile one or more of ECT, Embedded JS, FreeMarker, Handlebars, Jade, Mustache, PlannerFw, String, Template7, Underscore, or Velocity formatted code to the high-level programming language (e.g., high-level programming language different than the language that the target reasoning graph is input into the computer) or documentation language.

In some embodiments, converting the templating language representation of the target reasoning graph into one or more of a high-level programming language representation or a documentation language representation of the target reasoning graph may include converting the templating language representation of the target reasoning graph to one or more of C, C++, Clojure, Go, Java, Javascript, Python, Ruby, Scala, or any other suitable high-level programming language, using the first compiler. In some embodiments, the first compiler may be programmed to convert the templating language to the high-level programming language (e.g., C, C++, Clojure, Go, Java, Javascript, Python, Ruby, or Scala, or any other suitable high-level programming language that is different than the programming language that the target reasoning graph is input into the computer in). In some embodiments, converting the templating language representation of the target reasoning graph into one or more of a high-level programming language representation or a documentation language representation of the target reasoning graph may include converting the templating language representation of the target reasoning graph to one or more of Microsoft Word, Google docs, OpenOffice, PDF, Lotus, Textmaker, LibreOffice, CSS, HTML, Javascript, SGML, XML or variants thereof, XSL, or any other suitable documentation language, using the first compiler. In some embodiments, the first compiler may be programmed to convert the templating language to one or more documentation languages (e.g., Microsoft Word, Google docs, OpenOffice, PDF, Lotus, Textmaker, LibreOffice, CSS, HTML, Javascript, SGML, XML or variants thereof, XSL, or any other suitable documentation language).

The high-level programming language representation (e.g., a second high-level programming language) or documentation language representation of the target reasoning graph may be further transliterated (e.g., compiled or assembled) into one or more additional code languages for execution of the reasoning functions therein, such as to determine an insight with the computer.

The method 400 includes an act 450 of, with a second compiler, converting the high-level programming language or the documentation language representation of the target reasoning graph to machine executable code. In some embodiments, the second compiler (e.g., compiler that is additional to or different from the compiler used for act 440). In some embodiments, the second compiler may be a standard compiler, such as a Java, C, C++, Scala, Go, or Clojure compiler, or any other compiler programmed to output any of the high-level programming languages disclosed herein. The second compiler may be stored in the computer (e.g., in the memory or storage device). The second compiler may be programmed to compile the high-level programming language or the documentation language into assembly language or machine executable code. For example, converting the high-level programming language or the documentation language representation of the target reasoning graph to machine executable code may include converting the high-level programming language representation of the target reasoning graph into assembly language (using a standard compiler) and converting the assembly language into machine executable code (using an additional compiler). Any of the compilers disclosed herein may include a compiler, an assembler, linker, or interpreter. For example, the assembly language (e.g., assembly language representation of the target reasoning graph) can be converted to machine executable code using an assembler.

In some embodiments, the assembly language may include one or more of ARM, MIPS, x86, or any other suitable assembly language. In some embodiments, converting the high-level programming language or the documentation language representation of the target reasoning graph to machine executable code may include converting the documentation language representation of the target reasoning graph to one or more of ARM, MIPS, x86, or any other suitable assembly language. In some embodiments, the assembly language representation of the target reasoning graph may be output such as in a computer file. For example, the method 400 may further include outputting the assembly language representation of the target reasoning graph such as to a computer or a component thereof. In some embodiments, converting the high-level programming language or the documentation language representation of the target reasoning graph to machine executable code may include converting the documentation language representation of the target reasoning graph to one or more virtual machine codes, such as Java Bytecode or any other suitable virtual machine code.

In some embodiments, converting the high-level programming language or the documentation language representation of the target reasoning graph to machine executable code may include converting the documentation language representation of the target reasoning graph to one or more of CSS, HTML, Javascript, XML, or any other suitable documentation language. In such embodiments, the method 400 may further include displaying the documentation language representation of the target reasoning graph on a web page. In some embodiments, the documentation language representation of the target reasoning graph, as displayed on the web page, may include the plain language representation of the target reasoning graph (or portions thereof such as reasoning paths and/or insights) on the web page.

In some embodiments, converting the high-level programming language or the documentation language representation of the target reasoning graph to machine executable code may include converting the documentation language representation of the target reasoning graph to one or more of Microsoft Word, Google docs, OpenOffice, PDF, Lotus, Textmaker, or LibreOffice formats. In some embodiments, the documentation language representation of the target reasoning graph may be output such as in a computer file. For example, the method 400 may further include outputting the documentation language representation of the target reasoning graph in Microsoft Word, Google docs, OpenOffice, PDF, Lotus, Textmaker, LibreOffice, or any other suitable documentation language format.

Figure 5:
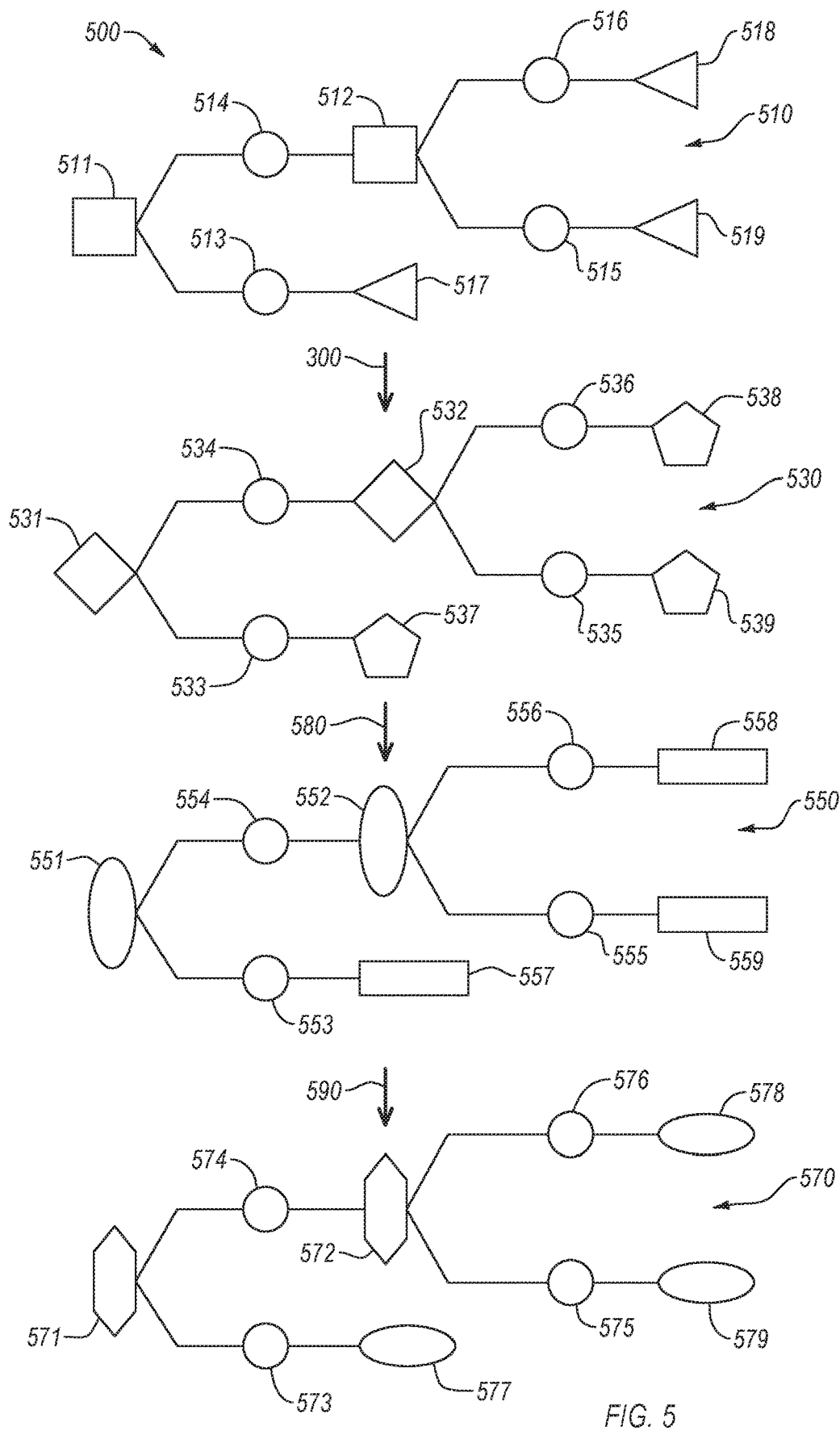
FIG. 5 is a schematic flow chart of a target reasoning graph as the target reasoning graph is processed using the method of FIG. 4, according to an embodiment.

FIG. 5 is a schematic flow chart 500 of a target reasoning graph as the target reasoning graph is processed using the method 400. The target reasoning graph 510 may include one or more internal nodes 511, 512 (and associated reasoning functions); one or more discrete decisions 513, 514, 515, 516; and one or more leaf nodes 517, 518, and 519 (and associated insights). The target reasoning graph 510 or any portion thereof may be similar or identical to any of the reasoning graphs or portions thereof disclosed herein. For example, the target reasoning graph 510 may be similar or identical to the reasoning graph 100. The target reasoning graph 510 or portions thereof may be in human readable format such as a plain language text format or a (first) high-level programming language.

The methods herein may include converting the reasoning graph (in human readable format) to the templating language representation of the target reasoning graph. The templating language representation of the target reasoning graph 530 may include one or more internal nodes 531, 532 (and associated reasoning functions); one or more discrete decisions 533, 534, 535, 536; and one or more leaf nodes 537, 538, and 539 (and associated insights); all in the templating language. The templating language may include ECT, Embedded JS, FreeMarker, Handlebars, Jade, Mustache, PlannerFw, String, Template7, Underscore, Velocity, or any other suitable templating language. The transliteration library 300 may be used to transliterate the target reasoning graph 510 to the templating language representation of the target reasoning graph 530. For example, the correlations between reasoning functions (at the internal nodes) of the target reasoning graph and the templating functions (templating language representations of the reasoning functions) may be used to generate the templating language representation of the target reasoning graph by substituting the plain language representation of the target reasoning graph input into the computer with the templating language representation of the target reasoning graph 530.

In some embodiments, the algorithm for transliterating the target reasoning graph to the templating language representation of the target reasoning graph may include a plurality of queries, searches, correlations, and substitutions. For example, the algorithm may query the target reasoning graph for reasoning functions at a first internal node and searches for correlations to corresponding templating functions. The algorithm includes replacing the reasoning function(s) (in the first programming language) with correlated templating function(s). The algorithm progresses sequentially through the reasoning graph and/or reasoning paths therein until a leaf node is reached. For example, the algorithm moves to a subsequent internal node or leaf node and continues until all of the reasoning functions of the internal nodes and insights of the leaf nodes in the first programming language format have been replaced with templating function representations of the same.

The methods herein may include converting the templating language representation of the target reasoning graph to one or more of a high-level programming languages (that is different than the first high-level programming language or plain language text format) or documentation language representations of the target reasoning graph 550. The high-level programming language or documentation language representation of the target reasoning graph 550 may include one or more internal nodes 551, 552 (and associated reasoning functions); one or more discrete decisions 553, 554, 555, 556; and one or more leaf nodes 557, 558, and 559 (and associated insights); in the high-level programming language or documentation language. The high-level programming language may include one or more of C, C++, HTML, Clojure, Go, Java, Javascript, Python, Ruby, Scala, or XML, or any other suitable high-level programming language. The documentation language may include one or more of CSS, HTML, Javascript, XML, Microsoft Word, Google docs, OpenOffice, PDF, Lotus, Textmaker, or LibreOffice formats, or any other suitable documentation language.

A first compiler 580 may be used to compile (e.g., translate) the templating language representation of the target reasoning graph 530 to the high-level programming language or documentation language representation of the target reasoning graph 550. For example, the first compiler 580 may be programmed to convert the templating language representation of the target reasoning graph 550 to the one or more of C, C++, HTML, Clojure, Go, Java, Javascript, Python, Ruby, Scala, or XML, or any other suitable high-level programming language; or to one or more of CSS, HTML, Javascript, XML, Microsoft Word, Google docs, OpenOffice, PDF, Lotus, Textmaker, or LibreOffice formats, or any other suitable documentation language.

The methods herein may include converting the high-level programming language or documentation language representation of the target reasoning graph 550 to machine executable code representation of the target reasoning graph 570. The machine executable code representation of the target reasoning graph 570 may include one or more internal nodes 571, 572 (and associated reasoning functions); one or more discrete decisions 573, 574, 575, 576; and one or more leaf nodes 577, 578, and 579 (and associated insights); in the machine executable code. In some embodiments, the machine executable code may include one or more of ARM, MIPS, x86, or any other suitable assembly language. In some embodiments, any other machine executable code may include bytecode (e.g., Java bytecode), scripting language, or any other machine executable code. For example, Java bytecode may be executed by a Java virtual machine.

A second compiler 590 may be used to compile (e.g., assemble or translate) the high-level programming language or documentation language representation of the target reasoning graph 550 to the machine executable code representation of the target reasoning graph 570. For example, the second compiler 590 may be programmed to convert the templating language representation of the target reasoning graph 550 to the one or more of ARM, MIPS, x86, or any other suitable assembly language, or to one or more of bytecode (e.g., Java bytecode), scripting language, or any other suitable machine executable code. In some embodiments, the second compiler 590 may include more than one compiler, such as to convert the high-level programming language or documentation language representation of the target reasoning graph 550 to an alternate code and then convert the alternate code the machine executable code. For example, the second compiler 590 may include an additional compiler and an assembler, where the assembler is used to convert the high-level programming language or documentation language representation of the target reasoning graph 550 to an assembly language representation of the target reasoning graph, and the second compiler (e.g., additional compiler) is used to convert the assembly language representation of the target reasoning graph to the machine executable code (e.g., machine code) representation of the target reasoning graph. The machine executable code representation of the target reasoning graph 570 may be output to and executed on a computer. Accordingly, the target reasoning graph may be transliterated from a first language (e.g., plain language text format or high-level programming language format) to a machine executable code format (e.g., assembly code or bytecode) wherein the target reasoning graph can be automatically executed to determine an insight using the reference data associated with the target reasoning graph. The target reasoning graph may additionally or alternatively be transliterated from the first language to a documentation language format wherein the target reasoning graph any portions thereof (e.g., insights or reasoning paths) may be output and viewed as documentation (e.g., in a webpage or document).

FIG. 6 is a flow chart of a method 600 of automatically determining an insight using a transliterated target reasoning graph, according to an embodiment. The method 600 includes the act 410 of inputting a target reasoning graph into a computer in data exchange format; the act 420 of providing, in the computer, a transliteration library; the act 430 of, with the computer, automatically generating a templating language representation of the target reasoning graph by correlating the reasoning functions of the target reasoning graph with the templating functions of the portfolio of templating functions corresponding thereto; an act 640 of, with the computer, converting the templating language representation of the target reasoning graph into one or more of a high-level programming language representation or a documentation language representation of the target reasoning graph; an act 650 of, with at least one compiler, converting the high-level programming language representation of the target reasoning graph to machine executable code; and an act 660 of, with the computer and the machine executable code of the target reasoning graph, determining an insight using the reference data to make each discrete decision corresponding to each reasoning function in the selected reasoning path until the selected reasoning path reaches a selected leaf node corresponding thereto.

The method 600 may take as input, a target reasoning graph and optionally, reference data, in a first format (e.g., first programming language or plain language text); transliterate the target reasoning graph into a templating language, generate representations of the target reasoning graph in a new format (e.g., second programming language or documentation language); convert (e.g., compile) the new format into machine executable code; and determine an insight with the reference data and transliterated (e.g., converted) reasoning graph. For example, the method 600 may be used to automatically transliterate a target reasoning graph (e.g., series of queries used to determine if an insurance claim should be covered) in a first programming language into a different programming language and eventually a machine executable code; and then determine an insight (e.g., determine if the insurance claim should be covered) using the converted or transliterated target reasoning graph. The method 600 can be accomplished using a computer and one or more compilers.

The method 600 includes the act 410 of inputting a target reasoning graph into a computer in data exchange format as described herein. For example, the act 410 of inputting a target reasoning graph into a computer in data exchange format, may include inputting any of the target reasoning graphs or portions thereof disclosed herein, into the computer in the data exchange format. The target reasoning graph may include a plurality of leaf nodes each defining an insight, a plurality of reasoning paths each terminating at a leaf node, and a plurality of internal nodes each describing a reasoning function in human readable format. Each reasoning function in the target reasoning graph may define a portion of the plurality of reasoning paths and define query(s) and inputs for making a discrete decision with reference data at a specific point along a selected reasoning path. The plurality of internal nodes, the plurality of leaf nodes, and the plurality of reasoning functions of the target reasoning graph may be in plain language text or high-level programming language. In some embodiments, inputting the target reasoning graph into the computer in data exchange format may include inputting the target reasoning graph into the computer in JSON, XML, or any other suitable data exchange format.

The method 600 includes the act 420 of providing, in the computer, a transliteration library as described herein. For example, the act 420 of providing, in the computer, a transliteration library, may include providing any of the transliteration libraries disclosed herein. The transliteration library may include a portfolio of templating functions in a templating language and a portfolio of reasoning functions in the plain language format as disclosed herein. The transliteration library defines a correspondence between each reasoning function of the portfolio of reasoning functions and a selected templating function of the portfolio of templating functions.

The method 600 includes the act 430 of, with the computer, automatically generating a templating language representation of the target reasoning graph by correlating the reasoning functions of the target reasoning graph with the templating functions of the portfolio of templating functions corresponding thereto as disclosed above. For example, automatically generating a templating language representation of the target reasoning graph by correlating the reasoning functions of the target reasoning graph with the templating functions of the portfolio of templating functions corresponding thereto may include selecting the templating functions and substituting the templating functions for the reasoning functions of the target reasoning graph as directed by the correlations therebetween (FIG. 3). Such correlation may be carried out automatically by the computer responsive to a computer program product including instructions for the same.

In some embodiments, the templating language representation of the target reasoning graph may include one or more links, call-outs, or other correlations, to the reference data for defining (e.g., providing) inputs in one or more of the reasoning functions of the target reasoning graph.

The method 600 includes an act 640 of, with the computer, converting the templating language representation of the target reasoning graph into one or more of a high-level programming language representation or a documentation language representation of the target reasoning graph. In some embodiments, converting the templating language representation of the target reasoning graph into one or more of a high-level programming language representation or a documentation language representation of the target reasoning graph may be similar or identical to the act 440 (FIG. 4), in one or more aspects. For example, the templating language representation of the target reasoning graph may be converted to the high-level programming language representation or the documentation language representation of the target reasoning graph, using one or more compilers. For example, converting the templating language representation of the target reasoning graph into one or more of the high-level programming language representation or the documentation language representation of the target reasoning graph may include one or more aspects of, with a first compiler, converting the templating language representation of the target reasoning graph into one or more of the high-level programming language representation or the documentation language representation of the target reasoning graph as described above with respect to the act 440, in one or more aspects.

In some embodiments, converting the templating language representation of the target reasoning graph into one or more of a high-level programming language representation or a documentation language representation of the target reasoning graph may include converting the templating language representation of the target reasoning graph to the (second) high-level programming language that is different than the (first) high-level programming language or plain language format. For example, converting the templating language representation of the target reasoning graph into one or more of a high-level programming language representation or a documentation language representation of the target reasoning graph may include converting the templating language representation of the target reasoning graph to one or more of C, C++, HTML, Clojure, Go, Java, Javascript, Python, Ruby, Scala, XML, or any other suitable high-level programming language. In some embodiments, converting the templating language representation of the target reasoning graph into one or more of the high-level programming language representation or the documentation language representation of the target reasoning graph may include converting the templating language representation of the target reasoning graph to the documentation language representation of the target reasoning graph that is human readable (e.g., a plain language representation) or an intermediate form thereof that is displayable in human readable form (e.g., HTML, XML, etc.). For example, converting the templating language representation of the target reasoning graph into one or more of a high-level programming language representation or a documentation language representation of the target reasoning graph may include converting the templating language representation to one or more of Microsoft Word, Google docs, OpenOffice, PDF, Lotus, Textmaker, LibreOffice formats, HTML, XML, or any other suitable documentation language.

The method 600 includes an act 650 of, with at least one compiler, converting the high-level programming language representation of the target reasoning graph to machine executable code. The at least one compiler may include a first compiler and one or more additional compilers, such as a second compiler. Each compiler may be programmed to (e.g., include code for performing) translate a programming language to a different programming language. For example, the first compiler may be programmed to convert high-level programming language to assembly language, and the additional (e.g., second) compiler may be programmed to convert the assembly language to machine executable code.

In some embodiments, converting the templating language representation of the target reasoning graph into one or more of the high-level programming language representation (or the documentation language representation) of the target reasoning graph may include one or more aspects of, with a (second) compiler, converting the high-level programming language (or the documentation language representation) of the target reasoning graph to machine executable code, as described above with respect to the act 450. For example, converting the high-level programming language representation of the target reasoning graph to machine executable code may include converting the high-level programming language representation of the target reasoning graph to assembly language using the (first) compiler. In some embodiments, converting the high-level programming language representation of the target reasoning graph to machine executable code may include converting a C, C++, Clojure, Go, Java, Javascript, Python, Ruby, Scala, or any other suitable high-level programming language representation of the target reasoning graph to an assembly language such as ARM, MIPS, x86, any other suitable assembly language, or to bytecode such as Java bytecode or any other suitable bytecode, using the (first) compiler. In such examples, converting the high-level programming language representation of the target reasoning graph to machine executable code may include converting the high-level programming language representation of the target reasoning graph to assembly language or bytecode using the additional (second) compiler. For example, converting the high-level programming language representation of the target reasoning graph to machine executable code may include converting the ARM, MIPS, x86, or any other suitable assembly language representation of the target reasoning graph to machine executable code such as assembly code, bytecode, scripting language, or any other machine executable code of the target reasoning graph, using the (second) compiler.

The machine executable code may be used to determine an insight of the target reasoning graph by using the reference data and queries encoded in the machine executable code. The method 600 includes an act 660 of, with the computer and the machine executable code of the target reasoning graph, determining an insight using the reference data to make each discrete decision corresponding to each reasoning function in the selected reasoning path until the selected reasoning path reaches a selected leaf node corresponding thereto. In some embodiments, with the computer and machine executable code of the target reasoning graph, determining an insight using the reference data to make each discrete decision corresponding to each reasoning function in the selected reasoning path until the selected reasoning path reaches a selected leaf node corresponding to the selected reasoning path may include executing the machine executable code of the target reasoning graph to determine the insight. For example, the computer or a computer program product stored and executed by the computer may include the machine executable code stored therein. The computer may execute the machine executable code to determine the insight using the reference data to make each discrete decision corresponding to each reasoning function in the selected reasoning path until the selected reasoning path reaches a selected leaf node corresponding thereto. For example, the computer may read the machine readable code corresponding to a query of a reasoning function and search the reference data to answer the query. After answering the query with the discrete decision, the computer may advance to read machine readable code corresponding to a reasoning function subsequent to the discrete decision in the reasoning path and answering the query of the subsequent reasoning function until the computer reads the machine executable code of the insight at the leaf node.

In some embodiments, the method 600 may further include outputting one or more of the target reasoning graph, reasoning path, one or more reasoning functions, or the insight. Outputting the target reasoning graph, reasoning path, one or more reasoning functions, or the insight may include outputting the target reasoning graph, reasoning path, one or more reasoning functions, or the insight in machine readable code, templating language, plain language text, high-level programming language, or documentation language. For example, the method 600 may include transliterating one or more of the insight, the selected reasoning path, the reasoning functions of the selected reasoning path, the selected leaf node (insight), or the reference data used to determine the discrete decisions corresponding to the reasoning functions of the selected reasoning path, to a plain language representation using the transliteration library. In such embodiments, the method 600 may include outputting the plain language representation of one or more of the insight, the selected reasoning path, the reasoning functions of the selected reasoning path, the selected leaf node (insight), or the reference data used to determine the discrete decisions corresponding to the reasoning functions of the selected reasoning path, using the computer.

In some embodiments, the method 600 may include transliterating the insight, the reasoning functions of the selected reasoning path, the selected leaf node, and the reference data used to determine the discrete decisions corresponding to the reasoning functions of the selected reasoning path, from the templating language to a documentation language representation using the transliteration library. In such embodiments, the method 600 may include outputting the documentation language representation of one or more of the insight, the selected reasoning path, the reasoning functions of the selected reasoning path, the selected leaf node (insight), or the reference data used to determine the discrete decisions corresponding to the reasoning functions of the selected reasoning path, using the computer.

Outputting the plain language representation or the documentation language representation of the insight, the selected reasoning path, the reasoning functions of the selected reasoning path, the selected leaf node (insight), or the reference data used to determine the discrete decisions corresponding to the reasoning functions of the selected reasoning path, may include outputting the one or more of Microsoft Word, Google docs, OpenOffice, PDF, Lotus, Textmaker, or LibreOffice formats, using the computer. Outputting the plain language representation or documentation language representation of the target reasoning path may include converting the documentation language representation to a document that is in human readable format, such as a web page, a spreadsheet, a text file (e.g., Microsoft Word), etc. In such examples, the method 600 may further include outputting the documentation, such as in electronic format. The documentation may be output (e.g., electronically delivered) to a user or an entity that requested the insight (e.g., the company or person that submitted the target reasoning path and associated reference data). For example, the documentation may be electronically mailed or otherwise transmitted to a user.

In some embodiments, the method 600 may include outputting the machine executable language representation of one or more of insight, the selected reasoning path, the reasoning functions of the selected reasoning path, the selected leaf node (insight), or the reference data used to determine the discrete decisions corresponding to the reasoning functions of the selected reasoning path, substantially as described above with respect to the documentation representation or documentation.

In some embodiments, the method 600 may include providing reference data, such as in any of the formats disclosed herein (e.g., plain language text, high-level programming language, templating language, assembly language, or machine executable code). In some embodiments, providing reference data may include providing links to, or callouts for, reference data. In some embodiments, the reference data may include one or more of look-up tables; subject specific information; National Correct Coding Initiative codes; codes representing diagnoses, amounts, dates; or any other suitable reference data.

Any of the methods disclosed herein may include any of the aspects (e.g., acts) of any of the other methods disclosed herein. The methods, computer program products, and systems disclosed herein may allow input of reasoning graphs in plain language, modular replacement of the reasoning functions therein with templating functions, and translations of the templating functions to a selected format (e.g., high-level programming language, documentation language, or machine executable code), to output or use the reasoning graphs in the selected format.

Replacing the reasoning functions with the templating functions may be carried out in a modular manner, whereby each individual reasoning function in the reasoning graph is substituted with a corresponding templating function. Accordingly, a single transliteration library may be used to transliterate any number of reasoning graphs that may contain any number of different (e.g., noncommon) reasoning functions.

Figure 7:
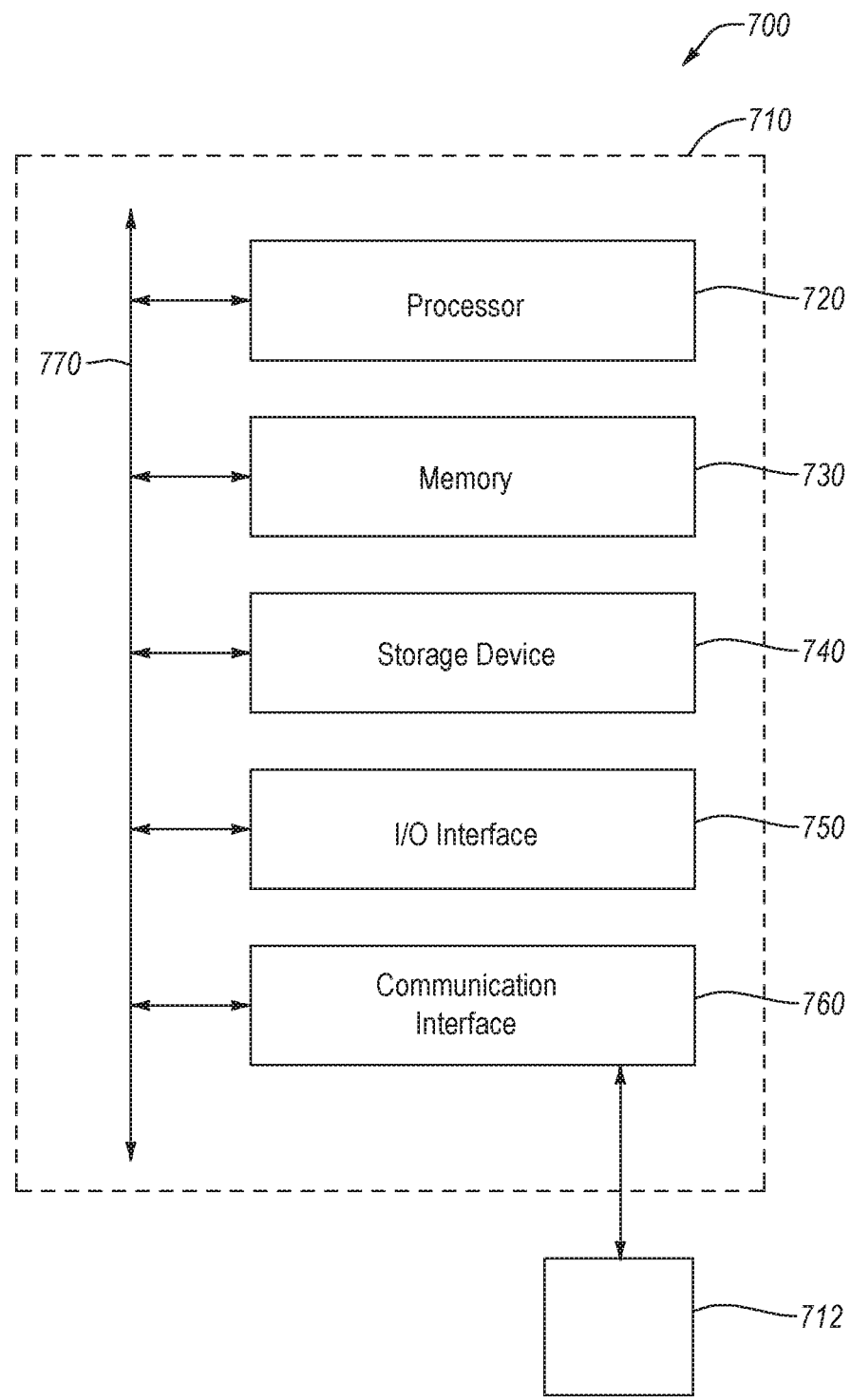
FIG. 7 is a schematic of a system for executing any of the methods disclosed herein, according to an embodiment.

FIG. 7 is a schematic of a system 700 for executing any of the methods disclosed herein, according to an embodiment. The system 700 may be configured to implement any of the methods disclosed herein, such as the method 200, 400, or 600. The system 700 includes at least one computing device 710. In some embodiments, the system 700 may include one or more additional computing devices 712, such as operably coupled thereto over a network connection. The at least one computing device 710 is an exemplary computing device that may be configured to perform one or more of the acts described above, such as the method 200, 400, or 600. The at least one computing device 710 can include one or more servers, one or more computers (e.g., desk-top computer, lap-top computer), or one or more mobile computing devices (e.g., smartphone, tablet, etc.). The computing device 710 can comprise at least one processor 720, memory 730, a storage device 740, an input/output ("I/O") interface 750, and a communication interface 760. While an example computing device 710 is shown in FIG. 7, the components illustrated in FIG. 7 are not intended to be limiting of the system 700 or computing device 710. Additional or alternative components may be used in some embodiments. Further, in some embodiments, the system 700 or the computing device 710 can include fewer components than those shown in FIG. 7. For example, the system 700 may not include the one or more additional computing devices 712. In some embodiments, the at least one computing device 710 may include a plurality of computing devices, such as a server farm, computational network, or cluster of computing devices. Components of computing device 710 shown in FIG. 7 are described in additional detail below.

In some embodiments, the processor(s) 720 includes hardware for executing instructions (e.g., processing a reasoning graph with selected uniquely identifiable data), such as those making up a computer program. For example, to execute instructions, the processor(s) 720 may retrieve (or fetch) the instructions from an internal register, an internal cache, the memory 730, or a storage device 740 and decode and execute them. In particular embodiments, processor(s) 720 may include one or more internal caches for data (e.g., reasoning graphs, transliteration libraries, reference data, etc., instructions (e.g., operational program(s) or computer program products for transliterating a target reasoning graph or carrying out any of the methods disclosed herein), or location data (e.g., locations of reference data). As an example, the processor(s) 720 may include one or more instruction caches, one or more data caches, and one or more translation lookaside buffers (TLBs). Instructions in the instruction caches may be copies of instructions in memory 730 or storage 740. In some embodiments, the processor 720 may be configured (e.g., include programming stored thereon or executed thereby) to carry out one or more portions of any of the methods disclosed herein.

In some embodiments, the processor 720 is configured to perform any of the acts disclosed herein such as in method 200, 400, or 600 or cause one or more portions of the computing device 710 or system 700 to perform at least one of the acts disclosed herein. Such configuration can include one or more operational programs (e.g., computer program products) that are executable by the at least one processor 720. For example, the processor 720 may be configured to automatically determine an insight using a transliterated target reasoning graph or automatically transliterate the target reasoning graph to a different language than the target reasoning graph was provided in, using the transliteration library. The at least one processor 720 may be configured to output the insight or transliterated target reasoning graph (in the different programming language than it was entered in), such as causing the I/O interface 750 to communicate the insight or transliterated target reasoning graph to an entity via the communication interface 760. The at least one processor 720 may be configured to provide a portal associated with the insight (e.g., user specific web address or user portal), such as causing the I/O interface 750 to communicate the portal, for accessing and viewing a textual explanation corresponding to an insight, to an entity via the communication interface 760 (e.g., provide a web-based portal). The at least one processor 720 may include programming to display, in the portal, the insight made using the target reasoning graph and the reference data, such as in the documentation language. The at least one processor 720 may include programming to display, in the portal, each of the plurality of reasoning functions and the discrete decisions made along the reasoning path corresponding to the insight, such as in the portal or an electronic mail. For example, the at least one processor 720 may cause the I/O interface 750 to communicate one or more of the insight, the plurality of reasoning functions, or the discrete decision(s), to an entity via electronic mail communicated from the communication interface 760.

The at least one computing device 710 (e.g., a server) may include at least one memory storage medium (e.g., memory 730 and/or storage 740). The computing device 710 may include memory 730, which is operably coupled to the processor(s) 720. The memory 730 may be used for storing data, metadata, and programs for execution by the processor(s) 720. The memory 730 may include one or more of volatile and non-volatile memories, such as Random Access Memory (RAM), Read Only Memory (ROM), a solid state disk (SSD), Flash, Phase Change Memory (PCM), or other types of data storage. The memory 530 may be internal or distributed memory.

The computing device 710 may include the storage device 740 having storage for storing data or instructions. The storage device 740 may be operably coupled to the at least one processor 720. In some embodiments, the storage device 740 can comprise a non-transitory memory storage medium, such as any of those described above. The storage device 740 (e.g., non-transitory storage medium) may include a hard disk drive (HDD), a floppy disk drive, flash memory, an optical disc, a magneto-optical disc, magnetic tape, or a Universal Serial Bus (USB) drive or a combination of two or more of these. Storage device 740 may include removable or non-removable (or fixed) media. Storage device 740 may be internal or external to the computing device 710. In some embodiments, storage device 740 may include non-volatile, solid-state memory. In some embodiments, storage device 740 may include read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these. In some embodiments, one or more portions of the memory 730 and/or storage device 740 (e.g., memory storage medium(s)) may store one or more databases thereon. At least some of the databases may be used to store one or more of a plurality of reasoning functions, one or more transliteration libraries (e.g., programming language-specific transliteration libraries), templating functions, insights, insights as applied to specific reasoning graphs made using specific reference data, or portions of any of the above, as disclosed herein.

In some embodiments, one or more of target reasoning graphs, transliteration libraries, compilers, or reference data may be stored in a memory storage medium such as one or more of the at least one processor 720 (e.g., internal cache of the processor), memory 730, or the storage device 740. In some embodiments, the at least one processor 720 may be configured to access (e.g., via bus 770) the memory storage medium(s) such as one or more of the memory 730 or the storage device 740. For example, the at least one processor 720 may receive and store the reference data (e.g., look-up tables, form data, uniquely identifiable data attributable to the unique entity) as a plurality of data points in the memory storage medium(s). The at least one processor 720 may execute programming stored therein adapted access the uniquely identifiable data in the memory storage medium(s) to automatically determine the insight, such as using at least some of the plurality of data points to make the discrete decisions. For example, the at least one processor 720 may access one or more of the transliteration library(s) or portions thereof, or reference data in the memory storage medium(s) such as memory 730 or storage device 740.

The computing device 710 also includes one or more I/O devices/interfaces 750, which are provided to allow a user to provide input to, receive output from, and otherwise transfer data to and from the computing device 710. These I/O devices/interfaces 750 may include a mouse, keypad or a keyboard, a touch screen, camera, optical scanner, network interface, web-based access, modem, a port, other known I/O devices or a combination of such I/O devices/interfaces 750. The touch screen may be activated with a stylus or a finger.

The I/O devices/interfaces 750 may include one or more devices for presenting output to a user, including, but not limited to, a graphics engine, a display (e.g., a display screen or monitor), one or more output drivers (e.g., display drivers), one or more audio speakers, and one or more audio drivers. In certain embodiments, devices/interfaces 750 are configured to provide graphical data (e.g., a portal and/or textual explanations) to a display (e.g., home or office computer screen) for presentation to a user. The graphical data may be representative of one or more graphical user interfaces and/or any other graphical content as may serve a particular implementation.

The computing device 710 can further include a communication interface 760. The communication interface 760 can include hardware, software, or both. The communication interface 760 can provide one or more interfaces for communication (such as, for example, packet-based communication) between the computing device 710 and one or more additional computing devices 712 or one or more networks. For example, communication interface 760 may include a network interface controller (NIC) or network adapter for communicating with an Ethernet or other wire-based network or a wireless NIC (WNIC) or wireless adapter for communicating with a wireless network, such as a WI-FI.

Any suitable network and any suitable communication interface 760 may be used. For example, computing device 710 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, one or more portions of system 700 or computing device 710 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 710 may include any suitable communication interface 760 for any of these networks, where appropriate.

In some embodiments, the computing device 710 may include a server having a network connection, and the server includes programming therein adapted to output the insights, target reasoning graphs, transliteration library, reference data or portions of any of the foregoing (in any format) over the network connection to an electronic address corresponding to an entity associated with the insight (e.g., a patient, a customer, a service provider, an insurer, an insured individual), responsive to determining the insight.

The computing device 710 may include a bus 770. The bus 770 can include hardware, software, or both that couples components of computing device 710 to each other. For example, bus 770 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

It should be appreciated that any of the acts described herein, such as in the method 200, 400, or 600 may be performed by and/or at the computing device 710. Additionally or alternatively, one or more of the acts described herein may be performed by or at another computing device such as additional computing device 712. For example, some of the acts may be performed by or on a personal computing device of the user (e.g., additional computing device 512), such as a personal computer, smart phone, etc., (e.g., receiving electronic messages), while one or more of the acts may be performed by another computing device (e.g., computing device 710), such as a server, that may be operably connected to the personal computing device of the user (e.g., transliteration of the target reasoning graph and/or determination of an insight may be performed by a server that is connected to the computing device of the user via the Internet). Accordingly, one or more elements of system 700 can be remotely distributed from one another and/or one or more elements of the system 700 can be collocated. For example, inputting the target reasoning graph may be performed via the additional computing device 712, such as by a medical professional, an auditor, an accountant, etc., manually providing the target reasoning graph into the computing device 710 via a network connection, or, by automatically transferring target reasoning graph via a data transfer routine, order, dump, or other mechanism. In some embodiments, the portal may be displayed on the additional computing device 712, such as via a web or network connection either directly or indirectly from the additional computing device 712 to the computing device 710.

In some embodiments, the at least one computing device 710 (e.g., the server) may be operably coupled to at least one remote computing device (e.g., additional computing device 712) and includes one or more operational programs therein configured cause the portal to display, in the at least one remote computing device, the insight or one or more portions of the target reasoning graph as a human readable format), such as each of the plurality of reasoning functions and discrete decisions made along the reasoning path. For example, the at least one computing device 710 may include programming that includes an internet site stored therein that provides the portal. An entity or user may input the target reasoning graphs (e.g., or any discrete portions thereof) and the reference data into, and/or request an insight from, the computing device 710 via the additional computing device 712.

FIG. 8 is a portal 800 for viewing an insight generated by the systems and methods disclosed herein, according to an embodiment. The portal 800 may include one or more fields providing a human readable explanation (e.g., documentation language or plain language text) of an insight, reasoning path, reasoning function(s), or discrete decision(s), according to an embodiment. For example, the portal 800 may include a first field 810 for providing documentation language or plain language text of the insight. The portal 800 may include one or more second fields 820 for providing a human readable explanation (e.g., documentation language or plain language text) of one or more reasoning functions in the reasoning path used to arrive at the insight. The portal 800 may include one or more third fields 830 for providing a human readable explanation (e.g., documentation language or plain language text) of one or more discrete decisions, such as discrete decisions corresponding to the one or more reasoning functions in the second field 820.

As shown, the portal 800 allows a user or entity to view the reasoning behind an insight. In some embodiments (not shown), the portal 800 may include an entry box for inputting a target reasoning graph and callouts or links for reference data.

Figure 9:
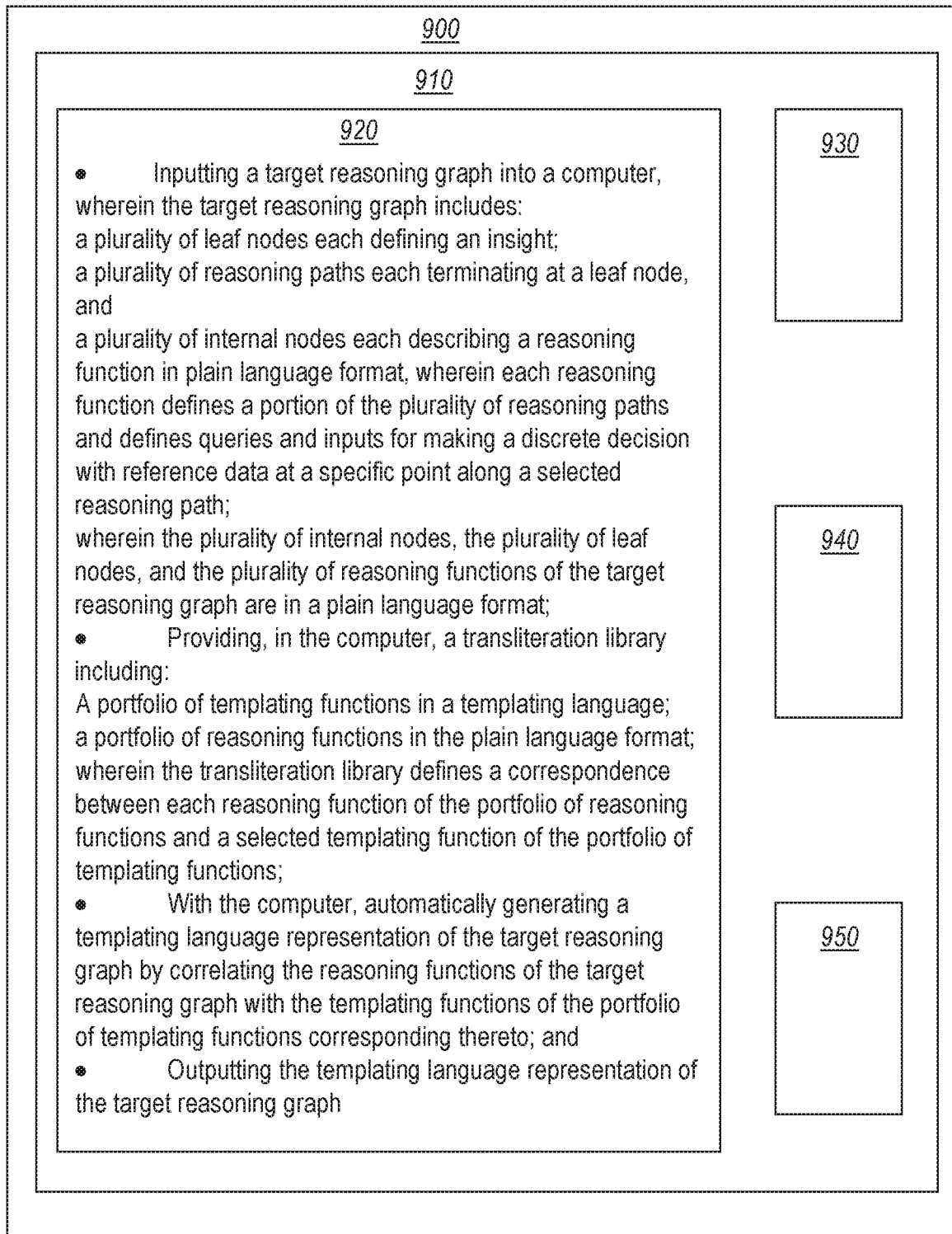
FIG. 9 is a block diagram of an example computer program product, according to an embodiment.

FIG. 9 is a block diagram of an example computer program product 900, according to an embodiment. The computer program product 900 is arranged to store instructions for transliterating target reasoning graphs and determining insights using target reasoning graphs as disclosed with respect to the methods 200, 400, and 600. The non-transitory signal bearing medium 910 may include a computer-readable medium 930 (e.g., read-only memory, RAM, hard drive such as a magnetic disc drive or solid state disc, flash memory stick, internal cache of a processor, or optical disc), a computer recordable medium 940 (e.g., RAM, hard drive, memory stick, optical disc, etc.), a computer communications medium 950 (e.g., internal cache of a BUS, etc.), or combinations thereof, stores programming instructions 920 (e.g., computer code) that may configure the processing unit of an associated computer storing the same to perform all or some of the methods or acts described herein. The instructions may include, for example, one or more machine readable and executable instructions for "inputting a target reasoning graph into a computer, wherein the target reasoning graph includes: a plurality of leaf nodes each defining an insight; a plurality of reasoning paths each terminating at a leaf node, and a plurality of internal nodes each describing a reasoning function in plain language format, wherein each reasoning function defines a portion of the plurality of reasoning paths and defines queries and inputs for making a discrete decision with reference data at a specific point along a selected reasoning path; wherein the plurality of internal nodes, the plurality of leaf nodes, and the plurality of reasoning functions of the target reasoning graph are in a plain language format." These instructions may include, for example, one or more machine readable and executable instructions for "providing, in the computer, a transliteration library including: a portfolio of templating functions in a templating language; a portfolio of reasoning functions in the plain language format; wherein the transliteration library defines a correspondence between each reasoning function of the portfolio of reasoning functions and a selected templating function of the portfolio of templating functions." The instructions may include, for example, one or more machine readable and executable instructions for "with the computer, automatically generating a templating language representation of the target reasoning graph by correlating the reasoning functions of the target reasoning graph with the templating functions of the portfolio of templating functions corresponding thereto." The instructions may include, for example, one or more machine readable and executable instructions for "outputting the templating language representation of the target reasoning graph." In some embodiments, the instructions may include any portions of the methods 200, 400, or 600 disclosed herein, in any combination.

In some embodiments, the computer program product may include a machine readable (and executable) program stored on a non-transitory computer readable medium. The machine readable (and executable) program may include an input module for accepting input of a target reasoning graph in data exchange format. The target reasoning graph may be similar or identical to any target reasoning graph disclosed herein, in one or more aspects. The machine readable program may include a transliteration library. The transliteration library may be similar or identical to any transliteration library disclosed herein, in one or more aspects. The machine readable program may include a transliteration module for automatically generating a templating language representation of the target reasoning graph by correlating the reasoning functions of the target reasoning graph with the templating functions of the portfolio of templating functions corresponding thereto as disclosed herein. The machine readable program may include a reference data library for storing the reference data, such as any of the reference data disclosed herein (e.g., one or more of look-up tables, subject specific information, National Correct Coding Initiative codes, codes representing diagnoses, amounts, or dates). The machine readable program may include a first compiler for converting the templating language representation of the target reasoning graph into one or more of a high-level programming language representation or a documentation language representation of the target reasoning graph as disclosed herein. The machine readable program may include a second compiler for converting the high-level programming language representation or the documentation language representation of the target reasoning graph into machine executable code as disclosed herein. The machine readable program may include an output module for outputting the machine executable code for the target reasoning graph.

In some embodiments, the input module for accepting input of a target reasoning graph in data exchange format is adapted to accept input of JSON or XML data exchange formats. In some embodiments, the templating language representation, the high-level programming language representation, documentation language representation or the machine executable code representation of the target reasoning graph may be similar or identical to any templating language representation, high-level programming language representation, documentation language representation or machine executable code representation of the target reasoning graph disclosed herein.

In some embodiments, outputting the machine executable code may include outputting the machine executable code to a computer or portions thereof (e.g., memory, storage medium, or processor).

The methods, computer program products, and systems disclosed herein provide a number of improvements to current systems and methods for generating or transliterating reasoning graphs. The systems and methods disclosed herein enable fast, automatic transliteration of reasoning graphs from a first programming language to one or more second program languages, via an intermediary templating language. For example, the transliteration library may be used to automatically transliterate a target reasoning graph in a first programming language into a more translatable templating language, which may be readily compiled to a different programming language than the first programming language. Accordingly, the methods, systems, and computer program products disclosed herein may eliminate the need for manual coding or translation of reasoning functions from one programming language to another. The methods, computer program products, and systems disclosed herein may provide dependably repeatable and faster generation of reasoning graphs (from a first programming language to a second programming language) for use in determining insights, than current methods and systems. Additionally, the methods, computer program products, and systems disclosed herein may eliminate the need for direct programming language to programming language translation software. For example, the methods, computer program products, and systems disclosed herein may provide for transliteration (e.g., translation) of the target reasoning graph to the templating language and then use of a standard or off-the-shelf compiler for transliterating the templating language representation of the target reasoning graph to a second programming language (e.g., that is different from the first programming language that the target reasoning graph was originally found in).

While various aspects and embodiments have been disclosed herein, other aspects and embodiments are contemplated. The various aspects and embodiments disclosed herein are for purposes of illustration and are not intended to be limiting.

What is claimed is:

1. A method of automatically outputting transliterations of a target reasoning graph, the method comprising:
   inputting a target reasoning graph into a computer, wherein the target reasoning graph includes:
      a plurality of leaf nodes each defining an insight;
      a plurality of reasoning paths each terminating at a leaf node, and
      a plurality of internal nodes each describing a reasoning function in plain language format, wherein each reasoning function defines a portion of the plurality of reasoning paths and defines queries and inputs for making a discrete decision with reference data at a specific point along a selected reasoning path;
      wherein the plurality of internal nodes, the plurality of leaf nodes, and the plurality of reasoning functions of the target reasoning graph are in a plain language format;
   providing, in the computer, a transliteration library including:
      a portfolio of templating functions in a templating language;
      a portfolio of reasoning functions in the plain language format;

wherein the transliteration library defines a correspondence between each reasoning function of the portfolio of reasoning functions and a selected templating function of the portfolio of templating functions;

with the computer, automatically generating a templating language representation of the target reasoning graph by correlating the reasoning functions of the target reasoning graph with the templating functions of the portfolio of templating functions corresponding thereto; and outputting the templating language representation of the target reasoning graph.

2. The method of claim 1, wherein the templating language representation of the target reasoning graph includes a plurality of target reasoning functions from the portfolio of reasoning functions represented as templating functions of the target reasoning graph.

3. The method of claim 1, further comprising:

with the computer, automatically generating a documentation language representation of the target reasoning graph by converting the templating language representation of the target reasoning graph into one or more of CSS, HTML, Javascript, or XML; and displaying the documentation language representation of the target reasoning graph on a screen.

4. The method of claim 1, further comprising:

with the computer, automatically generating a documentation language representation of the target reasoning graph by converting the templating language representation of the target reasoning graph another format; and displaying the documentation language representation of the target reasoning graph after the converting.

5. The method of claim 1, wherein inputting a target reasoning graph into a computer includes inputting the target reasoning graph in data exchange format.

6. The method of claim 5, wherein the data exchange format includes one or more of JSON or XML format.

7. The method of claim 6, further comprising converting the templating language representation of the target reasoning graph into one or more high-level programming language representations of the target reasoning graph, with a compiler.

8. The method of claim 7, further comprising converting the one or more high-level programming language representations of the target reasoning graph to an assembly language representation of the target reasoning graph, with a standard compiler.

9. The method of claim 8, further comprising converting the assembly language representation of the target reasoning graph into machine executable code with an additional compiler.

10. The method of claim 1, further comprising converting the templating language representation of the target reasoning graph into one or more high-level programming languages.

11. The method of claim 10, wherein of converting the templating language representation of the target reasoning graph into one or more high-level programming languages includes converting the templating language into one or more of C, C++, Clojure, Go, Java, Javascript, Python, Ruby, or Scala, with a compiler.

12. The method of claim 1, wherein the templating language representation of the target reasoning graph includes one or more links to the reference data for defining inputs in one or more of the reasoning functions.

13. The method of claim 12, wherein the reference data defines one or more of the inputs for making one or more of the discrete decisions.

14. A method of automatically outputting transliterations of a target reasoning graph, the method comprising:

inputting a target reasoning graph into a computer in data exchange format, wherein the target reasoning graph includes:

a plurality of leaf nodes each defining an insight;

a plurality of reasoning paths each terminating at a leaf node, and a plurality of internal nodes each describing a reasoning function in plain language format, wherein each reasoning function defines a portion of the plurality of reasoning paths and defines queries and inputs for making a discrete decision with reference data at a specific point along a selected reasoning path;

wherein the plurality of internal nodes, the plurality of leaf nodes, and the plurality of reasoning functions of the target reasoning graph are in a plain language format;

providing, in the computer, a transliteration library including:

a portfolio of templating functions in a templating language;

a portfolio of reasoning functions in the plain language format;

wherein the transliteration library defines a correspondence between each reasoning function of the portfolio of reasoning functions and a selected templating function of the portfolio of templating functions;

with the computer, automatically generating a templating language representation of the target reasoning graph by correlating the reasoning functions of the target reasoning graph with the templating functions of the portfolio of templating functions corresponding thereto;

with a first compiler, converting the templating language representation of the target reasoning graph into one or more of a high-level programming language representation or a documentation language representation of the target reasoning graph; and with a second compiler, converting the high-level programming language or the documentation language representation of the target reasoning graph to machine executable code.

15. The method of claim 14, wherein converting the templating language representation of the target reasoning graph into one or more of a high-level programming language representation or a documentation language representation of the target reasoning graph includes converting the templating language representation of the target reasoning graph to one or more of C, C++, Clojure, Go, Java, Javascript, Python, Ruby, or Scala.

16. The method of claim 14, wherein converting the high-level programming language or the documentation language representation of the target reasoning graph to machine executable code includes converting the high-level programming language representation of the target reasoning graph into assembly language and converting the assembly language into machine executable code.

17. The method of claim 14, wherein converting the high-level programming language or the documentation language representation of the target reasoning graph to machine executable code includes converting the documentation language representation of the target reasoning graph to one or more of CSS, HTML, Javascript, or XML.

18. The method of claim 17, further comprising displaying the documentation language representation of the target reasoning graph on a web page.

19. The method of claim 18, wherein the documentation language representation of the target reasoning graph includes the plain language representation of the target reasoning graph on the web page.

20. A method of automatically determining an insight using a transliterated target reasoning graph, the method comprising:
  inputting a target reasoning graph into a computer in data exchange format, wherein the target reasoning graph includes:
    a plurality of leaf nodes each defining an insight;
    a plurality of reasoning paths each terminating at a leaf node, and
    a plurality of internal nodes each describing a reasoning function in plain language format, wherein each reasoning function defines a portion of the plurality of reasoning paths and defines queries and inputs for making a discrete decision with reference data at a specific point along a selected reasoning path;
    wherein the plurality of internal nodes, the plurality of leaf nodes, and the plurality of reasoning functions of the target reasoning graph are in a plain language format;
  providing, in the computer, a transliteration library including:
    a portfolio of templating functions in a templating language;
    a portfolio of reasoning functions in the plain language format;
    wherein the transliteration library defines a correspondence between each reasoning function of the portfolio of reasoning functions and a selected templating function of the portfolio of templating functions;
  with the computer, automatically generating a templating language representation of the target reasoning graph by correlating the reasoning functions of the target reasoning graph with the templating functions of the portfolio of templating functions corresponding thereto;
  with the computer, converting the templating language representation of the target reasoning graph into one or more of a high-level programming language representation or a documentation language representation of the target reasoning graph;
  with at least one compiler, converting the high-level programming language representation of the target reasoning graph to machine executable code; and
  with the computer and the machine executable code of the target reasoning graph, determining an insight using the reference data to make each discrete decision corresponding to each reasoning function in the selected reasoning path until the selected reasoning path reaches a selected leaf node corresponding thereto.

21. The method of claim 20, wherein the reference data includes one or more of look-up tables, subject specific information, National Correct Coding Initiative codes, codes representing diagnoses, amounts, or dates.

22. The method of claim 20, wherein, with the computer and the machine executable code of the target reasoning graph, determining an insight using the reference data to make each discrete decision corresponding to each reasoning function in the selected reasoning path until the selected reasoning path reaches a selected leaf node corresponding to the selected reasoning path, includes executing the machine executable code of the target reasoning graph to determine the insight.

23. The method of claim 20, further comprising outputting the insight.

24. The method of claim 20, wherein the templating language representation of the target reasoning graph includes one or more links to the reference data for defining inputs in one or more of the reasoning functions of the target reasoning graph.

25. The method of claim 20, wherein the reference data is provided in machine executable code.

26. The method of claim 20, further comprising transliterating one or more of the insight, the selected reasoning path, the reasoning functions of the selected reasoning path, the selected leaf node, or the reference data used to determine the discrete decisions corresponding to the reasoning functions of the selected reasoning path, to a plain language representation using the transliteration library.

27. The method of claim 26, further comprising outputting the plain language representation using the computer.

28. The method of claim 26, further comprising transliterating the insight, the reasoning functions of the selected reasoning path, the selected leaf node, and the reference data used to determine the discrete decisions corresponding to the reasoning functions of the selected reasoning path, from the templating language to a documentation language representation using the transliteration library.

29. The method of claim 20, wherein converting the templating language representation of the target reasoning graph into one or more of a high-level programming language representation or a documentation language representation of the target reasoning graph includes converting the templating language representation of the target reasoning graph to one or more of C, C++, HTML, Clojure, Go, Java, Javascript, Python, Ruby, Scala, or XML.

30. The method of claim 20, wherein inputting the target reasoning graph into the computer in data exchange format includes inputting the target reasoning graph into the computer in JSON or XML format.

31. A computer program product for of automatically outputting transliterations of a target reasoning graph, the computer program product comprising:
  a machine readable program stored on a non-transitory computer readable medium, the machine readable program including:
    an input module configured for accepting input of a target reasoning graph in data exchange format, wherein the target reasoning graph includes:
      a plurality of leaf nodes each defining an insight;
      a plurality of reasoning paths each terminating at a leaf node, and
      a plurality of internal nodes each describing a reasoning function in plain language format, wherein each reasoning function defines a portion of the plurality of reasoning paths and defines queries and inputs for making a discrete decision with reference data at a specific point along a selected reasoning path;
      wherein the plurality of internal nodes, the plurality of leaf nodes, and the plurality of reasoning functions of the target reasoning graph are in a plain language format;
    a transliteration library including:
      a portfolio of templating functions in a templating language;

a portfolio of reasoning functions in the plain language format;
wherein the transliteration library defines a correspondence between each reasoning function of the portfolio of reasoning functions and a selected templating function of the portfolio of templating functions;
a transliteration module configured for automatically generating a templating language representation of the target reasoning graph by correlating the reasoning functions of the target reasoning graph with the templating functions of the portfolio of templating functions corresponding thereto;
a reference data library for storing the reference data;
a first compiler for converting the templating language representation of the target reasoning graph into one or more of a high-level programming language representation or a documentation language representation of the target reasoning graph;
a second compiler for converting the high-level programming language representation or the documentation language representation of the target reasoning graph into machine executable code; and
an output module configured for outputting the machine code.

32. The computer program product of claim 31, wherein the input module is configured to accept input of JSON or XML data exchange formats.

33. The computer program product of claim 31, wherein the high-level programming language representation includes one or more of C, C++, HTML, Clojure, Go, Java, Javascript, Python, Ruby, Scala, or XML.

34. The computer program product of claim 31, wherein the documentation language representation includes one or more of CSS, HTML, Javascript, or XML.

35. The computer program product of claim 31, wherein the reference data includes one or more of look-up tables, subject specific information, National Correct Coding Initiative codes, codes representing diagnoses, amounts, or dates.

* * * * *